United States Patent [19]
Henderson

[11] Patent Number: 5,493,494
[45] Date of Patent: * Feb. 20, 1996

[54] METHOD AND APPARATUS FOR OPERATING COMPACTING MACHINERY RELATIVE TO A WORK SITE

[75] Inventor: Daniel E. Henderson, Washington, Ill.

[73] Assignee: Caterpillar, Inc., Peoria, Ill.

[ * ] Notice: The portion of the term of this patent subsequent to Nov. 28, 2012, has been disclaimed.

[21] Appl. No.: 322,816

[22] Filed: Oct. 13, 1994

Related U.S. Application Data

[63] Continuation-in-part of Ser. No. 164,171, Dec. 8, 1993.

[51] Int. Cl.$^6$ ............................ G01C 21/00; G06F 15/00
[52] U.S. Cl. ................ 364/424.07; 364/424.01; 364/460; 342/357; 340/988; 340/990
[58] Field of Search .................. 364/424.07, 424.01, 364/424.02, 449, 457, 433, 434, 460, 551.02, 559, 560, 146, 149, 150, 151; 340/988, 990, 991; 342/357, 358, 359, 450, 451, 457, 462

[56] References Cited

U.S. PATENT DOCUMENTS

| | | | |
|---|---|---|---|
| 4,807,131 | 2/1989 | Clegg | 364/424.01 |
| 4,965,586 | 10/1990 | O'Neill et al. | 342/357 |
| 5,100,229 | 3/1992 | Lundberg et al. | 356/1 |
| 5,148,110 | 9/1992 | Helms | 324/323 |
| 5,265,025 | 11/1993 | Hirata | 364/449 |
| 5,287,280 | 2/1994 | Yamamoto et al. | 364/424.07 |

*Primary Examiner*—Michael Zanelli
*Assistant Examiner*—Tan Q. Nguyen
*Attorney, Agent, or Firm*—Young, MacFarlane & Wood

[57] ABSTRACT

A method and apparatus for operating compacting machinery such as landfill, earth or asphalt compactors relative to a work site to compact the site material toward a desired degree of compaction. A first model representing the desired degree of compaction of the site and a second model representing the actual degree of compaction of the site are stored in a digital data storage facility. The machine is equipped with a position receiver to determine in three-dimensional space the location of the compacting portions of the machine relative to the site. A dynamic database receives the machine position information, determines the difference between the degree of compaction of the first and second site models and generates representational signals of that difference for directing the operation of the machine to bring the actual degree of compaction of the site into conformity with the desired degree of compaction. In one embodiment, the signals representing the machine position and the difference between the first and second site modes are used to generate an operator display which is updated in real time as the machine operates over the site. A method is illustrated for determining the difference between the first and second site models using a relative degree of compaction standard based on the amount of elevation change effected by a compacted pass.

18 Claims, 18 Drawing Sheets

METHOD AND APPARATUS FOR OPERATING COMPACTING MACHINERY RELATIVE TO A WORK SITE

REFERENCE TO PRIOR APPLICATION

This application is a continuation-in-part of co-pending U.S. patent application Ser. No. 08/164,171, filed Dec. 8, 1993.

FIELD OF THE INVENTION

This invention relates to the operation of machinery for compacting the surface of a work site and, more particularly, to the real time generation and use of digital data which collectively represents the degree of compaction of the work site as it is being altered by the machinery toward a desired state.

As used in this patent specification the phrase "compacting machinery" and various approximations thereof refer to self-propelled mobile machines such as wheel-type landfill, earth and asphalt compactors which exhibit both (1) mobility over a work site as a result of being provided with a prime mover (for example an engine) on a frame which drives wheels supporting the frame, and (2) the capacity to compact the work site as a consequence of the provision on the frame of one or more wheels or rollers which serve as both carriage support and the compacting tool.

BACKGROUND OF THE INVENTION

Despite the development of sophisticated and powerful compacting machinery it remains a time consuming and labor intensive chore to adequately compact material such as trash, earth, or asphalt at work sites such as landfills, construction sites, roads and the like. The material to be compacted, for example trash or waste in a landfill, is typically spread over the site in an uncompacted state and must be repeatedly traversed by a compactor until it is compressed to a predetermined desired degree of compaction. A common type of compacting machinery includes one or more heavy compacting wheels or rollers which compact the material in their path. Success in achieving the desired degree of compaction of the material on the site is measured, for example, by the number of passes a compacting wheel makes over a given area or by the elevational change from the uncompacted level.

Until now compacting operations have largely been monitored and controlled by the machinery operators and supervisors on an intuitive basis, and with the use of static site surveys and physical markers to measure and monitor the compacting operation and the overall topography of the site. For example, after empirically determining the number of passes needed to compact the site material to a desired degree of compaction, the operator drives the compacting machinery back and forth over the site, gauging by memory, feel, visual observation and perhaps comparison to colored stakes or similar physical cues when the desired degree of compaction has been reached. This process is complicated by the frequent addition of new, uncompacted material to the site. Each time new material is placed on the site, the previous compaction work on that area is effectively erased and the operator must start over in compacting that area. Where the site has not been uniformly compacted prior to the addition of new material, or where the material is added to only a portion of the site while the operator is in the middle of a compacting operation, the likelihood that the compacting operation can be monitored and completed uniformly and efficiently is significantly reduced.

For more certain knowledge of the degree to which the uncompacted material and the site in general have been brought into conformity with the desired degree of compaction and desired site topography, a supervisor or survey crew from time to time verifies the amount of compaction and site build-up and manually updates any staking or marking of the site and the site model. Between these occasional verifications the compacting machinery operators and supervisors have no truly accurate way to monitor and measure their real time progress.

Accordingly, even the most skillful and experienced operators can achieve only limited efficiency in compacting a large land site, such difficulty being due in part to the absence of large scale as well as detailed information as to the real-time progress being made in the compaction of the site.

SUMMARY DISCLOSURE OF THE INVENTION

The invention provides a solution to the long standing problems of operating compacting machinery to accurately and efficiently compact material on a work site toward a desired degree of compaction. The subject invention achieves such compacting operations without the need for physical markers on the site to cue the operator, with only such interruptions in operation as are needed, for example, to refuel the machinery, and with a minimum need for crew.

In general, this is accomplished through the provision of a digital data storage, retrieval and process facility which per se may be carried on the compacting machinery or located remotely from the compacting machinery but connected, for example, by radio link to the compacting machinery for storing, actually creating, and modifying a digital model of the site as it exists at any given time, as well as a digital model of the desired degree of compaction of the site.

In one embodiment or utilization of the above-described apparatus and method the first site model is a predetermined compaction standard for the site topography, representing the compacting operations needed to bring the uncompacted topography or surface material to a desired degree of compaction. The present embodiment of the inventive apparatus and method uses a relative degree of compaction standard, monitoring the relative change in the elevation or z-component of the site topography. When the amount of elevation change on a given pass of the machine falls below a predetermined level, the site database is updated to indicate that the desired degree of compaction has been reached.

In the apparatus aspect, the invention comprises a digital data storage and retrieval device for storing a first site model representing a desired degree of compaction of the site and a second site model representing the actual degree of compaction of the site, the degree of compaction comprising a relative degree of compaction based on relative change in the elevation of the site. Apparatus is provided for generating digital signals representing in real time the instantaneous position in three-dimensional space of a portion of the compacting machine as it traverses the site. The apparatus further includes means for receiving the position signals and for updating the second site model in accordance therewith, and for determining the difference between the first and second site models in real time, comprising the difference between the actual degree of compaction of the site and the desired degree of compaction of the site as a function of relative change in the elevation of the site. The apparatus further includes means for directing the operation of the compacting machine in accordance with the difference to bring the second site model into conformity with the first site In the method aspect of the invention, the method includes the steps of producing and storing in a digital data storage and retrieval means both a first site model representing a predetermined desired degree of compaction of the site and a second site model representing the actual degree of compaction of the site, the degree of compaction comprising a relative degree of compaction based on relative change in the elevation of the site; generating signals representing in real time the instantaneous position in three-dimensional space of at lease a portion of the compacting machine as it traverses the site; updating the second model in accordance with said three-dimensional position signals; determining the difference between the first and second site models in real time, comprising the difference between the actual degree of compaction of the site and the desired degree compaction of the site as a function of a relative change in the elevation of the site; and, directing the operation of the compacting machine in accordance with the difference to bring the second site model into conformity with the first site model.

In a further form of the present invention, the elevation of the compactor wheel or roller at a given coordinate or grid element of the site database is compared to a previously measured elevation at that location. If the presently measured elevation is greater than the previously measured elevation beyond a predetermined limit, the database is updated to reflect that a new "lift" of material has been detected at that location. If the presently measured elevation is the same as the previous elevation, or within a predetermined limit, the database is updated to reflect that complete compaction has been achieved for the present lift of material at that location.

The degree of compaction of a lift of material can optionally be updated in an incremental, step-by-step manner between the uncompacted and fully compacted states, for example by monitoring the relative percentage of compaction between passes.

BRIEF DESCRIPTION OF THE DRAWINGS

FIGS. 7A–7I are flowchart representations of a dynamic site database used to carry out the present invention;

DETAILED DESCRIPTION OF THE ILLUSTRATED EMBODIMENTS

Figure 1:
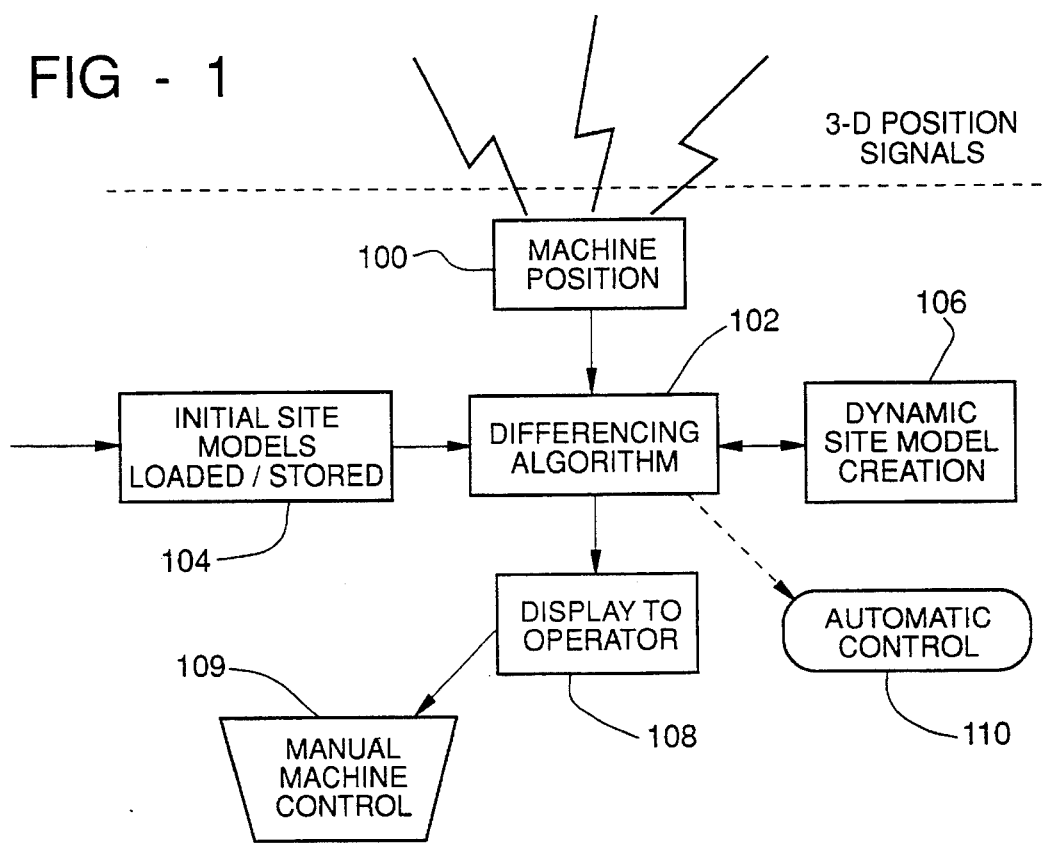
FIG. 1 is a schematic representation of a compacting machinery position and control method used in carrying out the present invention.

Referring to FIG. 1, the method of the present invention for use in a compacting operation is shown schematically. Using a known three-dimensional positioning system with an external reference, for example (but not limited to) 3-D laser, GPS, GPS/laser combinations or radar, compacting machine position coordinates are determined in block 100 as the machine moves over the site. These coordinates are instantaneously supplied as a series of discrete points to a differencing algorithm at 102. The differencing algorithm calculates the machine position and path in real time. Digitized models of the actual and desired degree of compaction of the site topography are loaded or stored at block 104, an accessible digital storage and retrieval facility, for example a local digital computer. The differencing algorithm 102 retrieves, manipulates and updates the site models from 104 and generates at 106 a dynamic site database of the difference between the actual site and the desired site model, updating the actual site model in real-time as new position information is received from block 100. This dynamically updated site model is then made available to the operator in display step 108, providing real time position, direction and site topography/compaction updates in human readable form. Using the information from the display the operator can efficiently monitor and direct the manual control of the compacting machine at 109.

Additionally, or alternately, the dynamic update information can be provided to an automatic machine control system at 110, for example an electrohydraulic control system of the type developed by Caterpillar Inc. and used to operate the various pumps, valves, hydraulic cylinders, motor/steering mechanisms and other controls used in compacting machinery. The electrohydraulic controls can provide an operator assist to minimize machine work and limit the manual controls if the operator's proposed action would, for example, overload the machine. Alternately, the site update information from the dynamic database can be used to provide fully automatic control of one or more machine operating systems.

It will be clear from the foregoing that with the present method a model of the initial, actual site topography can be generated by the compacting machine itself on previously unsurveyed terrain. By simply moving the machine over a proposed site in a regular pattern, the current topography can be determined. Once the initial topography of the site is established as an initial three-dimensional reference, actual and desired site models can be loaded at 104. The desired site model is a predetermined desired degree of compaction of material on the site surface. The actual site model is the actual degree of compaction of the site material, ranging between an uncompacted state and the desired degree of compaction. When the machine traverses the site in a compacting operation, the actual site model is monitored and updated in real time at 106 as the machine brings the actual site into conformity with the desired site model.

Figure 2:
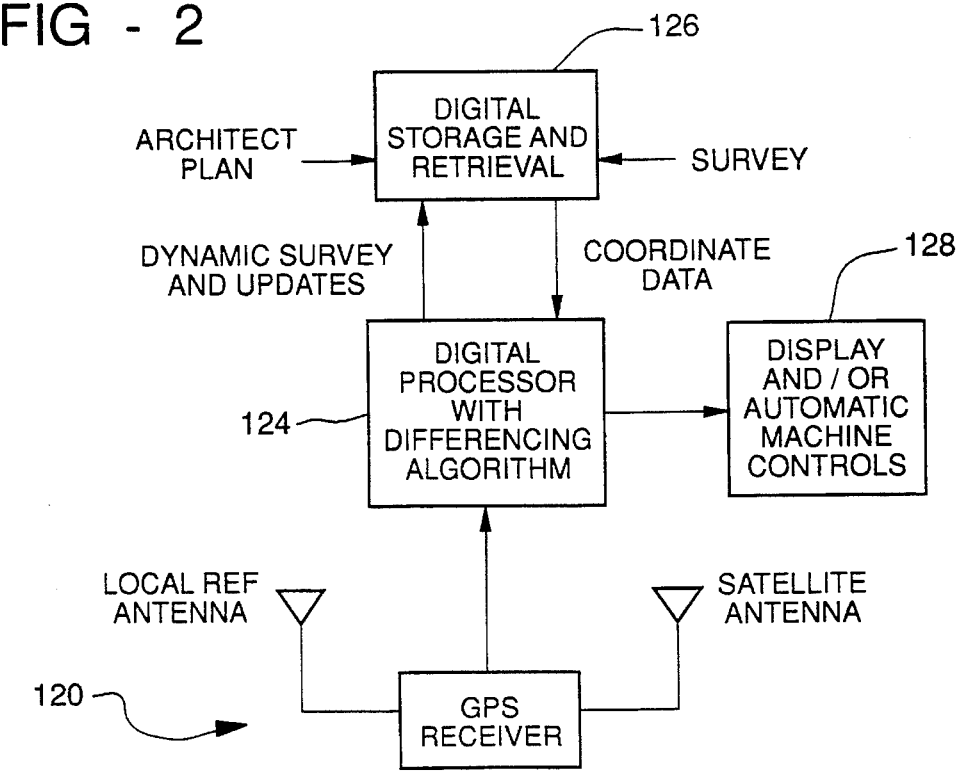
FIG. 2 is a schematic representation of an apparatus which can be used in connection with the receipt and processing of GPS signals to carry out the present invention.

Referring now to FIG. 2, an apparatus which can be used in connection with the receipt and processing of GPS signals to carry out the present compacting invention is shown in block diagram form comprising a GPS receiver apparatus 120 with a local reference antenna and a satellite antenna; a digital processor 124 employing a differencing algorithm, and connected to receive position signals from 120; a digital storage and retrieval facility 126 accessed and updated by processor 124, and an operator display and/or automatic machine controls at 128 receiving signals from processor 124.

GPS receiver system 120 includes a satellite antenna receiving signals from global positioning satellites, and a local reference antenna. The GPS receiver system 120 uses position signals from the satellite antenna and differential correction signals from the local reference antenna to generate position coordinate data in three-dimensions to centimeter accuracy for moving objects. Alternatively, raw data from the reference antenna can be transmitted to processor 124, where the differential correction can be locally determined.

This position information is supplied to digital processor 124 on a real-time basis as the coordinate sampling rate of the GPS receiver 120 permits. The digital storage facility 126 stores a first site model of the desired degree of compaction of the site, for example according to a predetermined compaction standard, and a second site model of the actual degree of compaction of the site, for example uncompacted as initially surveyed. The actual site model can be accessed and updated in real time by digital processor 124 as it receives new position information from GPS receiver 120.

Digital processor 124 further generates signals representing the difference between the continuously-updated actual site model and the desired site model. These signals are provided to the operator display and/or automatic machine controls at 128 to direct the operation of the machine over the site to bring the updated actual site model into conformity with the desired site model. The operator display at 128, for example, provides one or more visual representations of the difference between the actual site model and the desired site model to guide the operator in running the machine for the necessary compacting operations.

Figure 3:
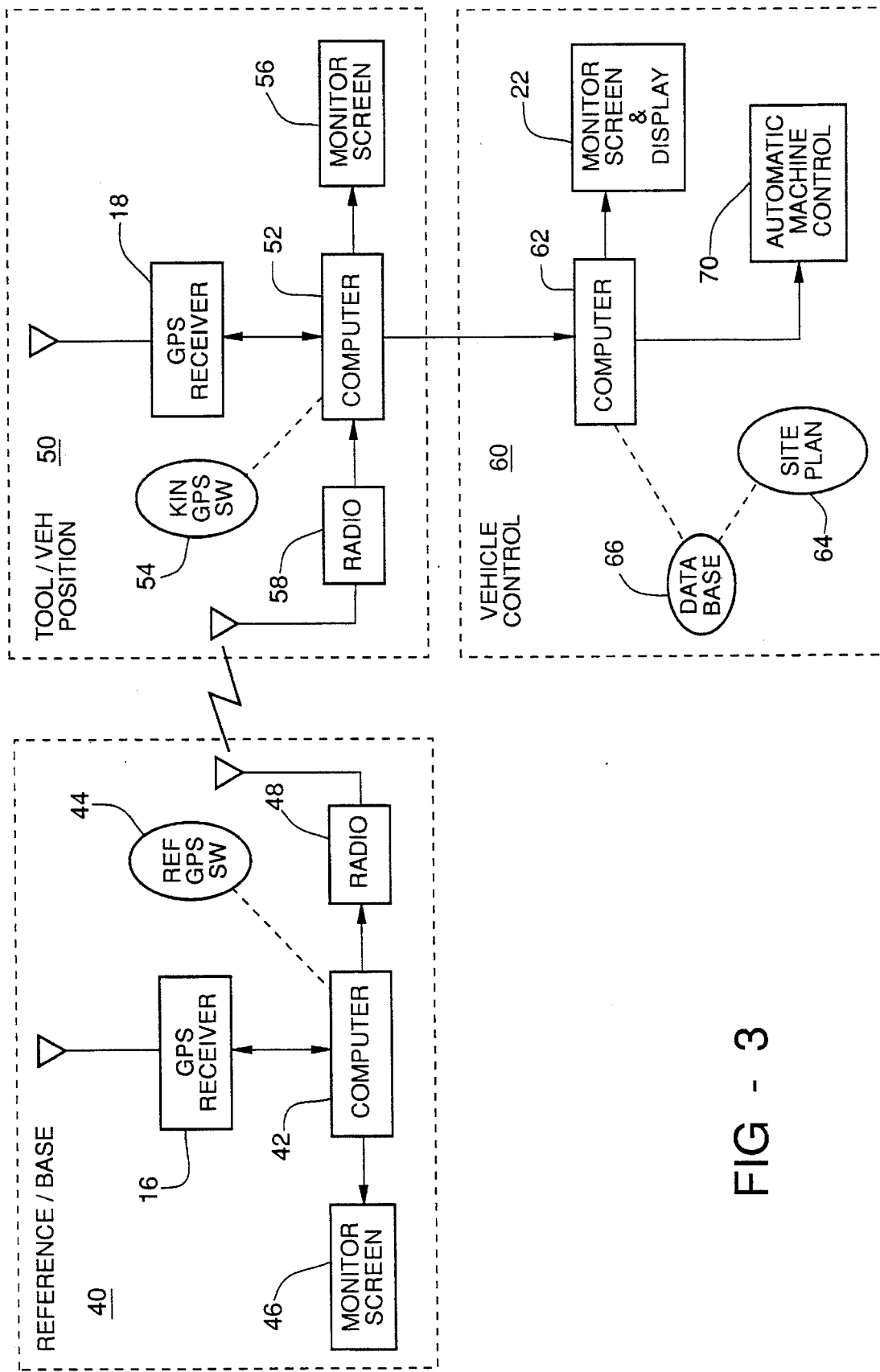
FIG. 3 is a detailed schematic representation of an embodiment of the system of FIG. 2 using GPS positioning.

Referring now to FIG. 3, a more detailed schematic of a system according to FIG. 2 is shown using kinematic GPS for position reference signals. A base reference module 40 and a position module 50 together determine the three-dimensional coordinates of the compacting machine relative to the site, while an update/control module 60 converts this position information into real time representations of the site which can be used to accurately monitor and control the machine.

Base reference module 40 includes a stationary GPS receiver 16; a computer 42 receiving input from receiver 16; reference receiver GPS software 44, temporarily or permanently stored in the computer 42; a standard computer monitor screen 46; and a digital transceiver-type radio 48 connected to the computer and capable of transmitting a digital data stream. In the illustrative embodiment base reference receiver 16 is a high accuracy kinematic GPS receiver; computer 42 for example is a 486DX computer with a hard drive, 8 megabyte RAM, two serial communication ports, a printer port, an external monitor port, and an external keyboard port; monitor screen 46 is a passive matrix color LCD; and radio 48 is a commercially available digital data transceiver.

Position module 50 comprises a matching kinematic GPS receiver 18, a matching computer 52 receiving input from receiver 18, kinematic GPS software 54 stored permanently or temporarily in computer 52, a standard computer monitor screen 56, and a matching transceiver-type digital radio 58 which receives signals from radio 48 in base reference module 40. In the illustrative embodiment position module 50 is located on the compacting machine to move with it over the work site.

Update/control module 60, also carried on board the compacting machine in the illustrated embodiment, includes an additional computer 62, receiving input from position module 50; one or more site models 64 digitally stored or loaded into the computer memory; a dynamic database update module 66, also stored or loaded into the memory of computer 62; and a color operator display screen 22 connected to the computer. Instead of, or in addition to, operator display 22, automatic machine controls 70 can be connected to the computer to receive signals which operate the machine in an automatic or semi-automatic manner in known fashion.

Although update/control module 60 is here shown mounted on the compacting machine, some or all portions may be stationed remotely. For example, computer 62, site model(s) 64, and dynamic database 66 could be connected by radio, data link to position module 50 and operator display 22 or machine control interface 70. Position and site update information can then be broadcast to and from the machine for display or use by operators or supervisors both on and off the machine.

Base reference station 40 is fixed at a point of known three-dimensional coordinates relative to the work site. Through receiver 16 base reference station 40 receives position information from a GPS satellite constellation, using the reference GPS software 44 to derive an instantaneous error quantity or correction factor in known manner. This correction factor is broadcast from base station 40 to position station 50 on the compacting machine via radio link 48, 58. Alternatively, raw position data can be transmitted from base station 40 to position station 50 via radio link 48, 58, and processed by computer 52.

Machine-mounted receiver 18 receives position information from the satellite constellation, while the kinematic GPS software 54 combines the signal from receiver 18 and the correction factor from base reference 40 to determine the position of receiver 18 and the compacting machine relative to base reference 40 and the work site within a few centimeters. This position information is three-dimensional (e.g., latitude, longitude and elevation) and is available on a point-by-point basis according to the sampling rate of the GPS system.

Referring to update/control module 60, once the digitized plans or models of the site have been loaded into computer 62, dynamic database 66 generates signals representative of the difference between the actual and desired degree of compaction of the site to display this difference graphically on operator display screen 22 relative to the site topography. Using the position information received from position module 50, the database 66 also generates a graphic icon of the compacting machine superimposed on the site topography on display 22 corresponding to the actual position and direction of the machine on the site.

Because the sampling rate of the position module 50 results in a time/distance delay between position coordinate points as the compacting machine moves over the site, the dynamic database 66 of the present invention uses a differencing algorithm to determine and update in real-time the path of the machine.

With the knowledge of the compacting machine's exact position relative to the site, the degree of compaction of the site, and the machine's progress relative thereto, the operator can maneuver the compacting machine over the site to compact it without having to rely on intuitive feel, memory or physical site markers. And, as the operator moves the machine over the site the dynamic database 66 continues to read and manipulate incoming position information from module 50 to dynamically update both the machine's position relative to the site, the path of the machine over the site, and any change in degree of compaction effected by the machine's passage. This updated information is used to generate representations of the site and can be used to direct the operation of the compacting machine in real time to bring the actual, updated site model into conformity with the desired site model.

INDUSTRIAL APPLICABILITY

Figure 4:
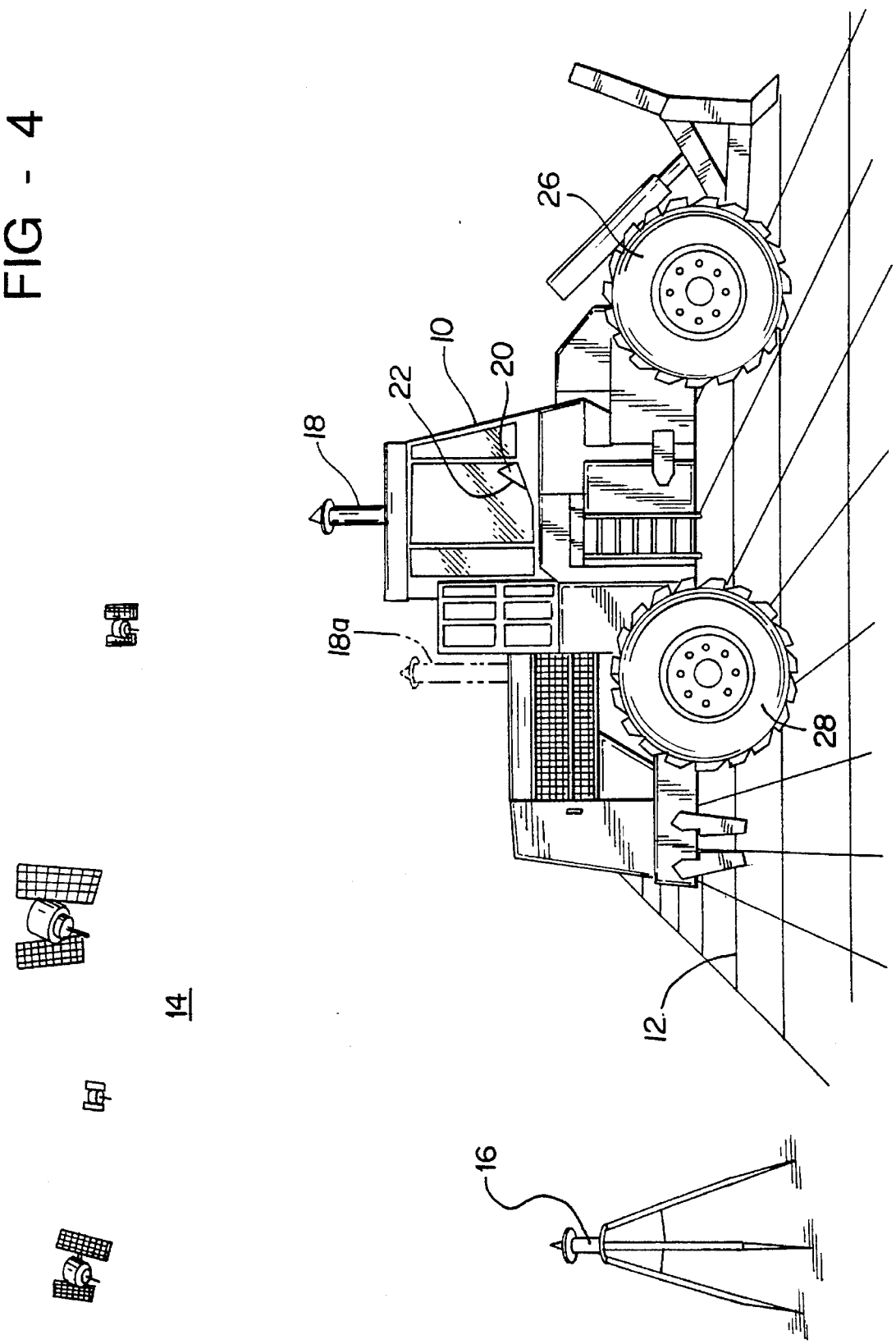
FIG. 4 is a schematic representation of a work site, compacting machine, and position and control system used to carry out an illustrative compacting embodiment of the present invention.

Referring to FIG. 4, a compacting machine 10 is shown on location at a construction site 12. In the illustrative embodiment of FIG. 4 machine 10 is a wheeled landfill compactor. It will become apparent, however, that the principles and applications of the present invention will lend themselves to virtually any compacting machine with the capacity to move over and compact material on the site.

Compactor 10 is equipped in known fashion with available hydraulic or electrohydraulic controls (not shown). In the embodiment of FIG. 4 these controls operate, for example, steering and motor controls. Compactor 10 includes two spaced front wheels 26 which can be turned to control the direction of the compactor, and two spaced rear wheels 28 which are fixed relative to the body or frame of compactor 10. The compactor wheels 26, 28 have wide, studded surfaces capable of compacting waste and trash in a landfill in known fashion. Compactor 10 is heavy, and may be weighted to increase the compacting force exerted by the wheels on the material which they traverse.

Machine 10 is equipped with a positioning system capable of determining the position of the machine and/or its compacting wheels with a high degree of accuracy, in the embodiment of FIG. 4 a phase differential GPS receiver 18 located on the machine at fixed, known coordinates relative to the site-contacting portions or "footprints" of the wheels. Machine-mounted receiver 18 receives position signals from a GPS constellation 14 and an error/correction signal from base reference 16 via radio link 48, 58 as described in FIG. 3. Machine-mounted receiver 18 uses both the satellite signals and the error/correction signal from base reference 16 to accurately determine its position in three-dimensional space. Alternatively, raw position data can be transmitted from base reference 16, and processed in known fashion by the machine-mounted receiver system to achieve the same result. Information on kinematic GPS and a system suitable for use with the present invention can be found, for example, in U.S. Pat. No. 4,812,991 dated Mar. 14, 1989 and U.S. Pat. No. 4,963,889 dated Oct. 16, 1990, both to Hatch. Using kinematic GPS or other suitable three-dimensional position signals from an external reference, the location of receiver 18 and compactor 10 can be accurately determined on a point-by-point basis within a few centimeters as compactor 10 moves over site 12. The present sampling rate for coordinate points using the illustrative positioning system is approximately one point per second.

The coordinates of base receiver 16 can be determined in any known fashion, such as GPS positioning or conventional surveying. Steps are also being taken in this and other countries to place GPS references at fixed, nationally surveyed sites such as airports. If site 12 is within range (currently approximately 20 miles) of such a nationally surveyed site and local GPS receiver, that local receiver can be used as a base reference. Optionally, a portable receiver such as 16, having a tripod-mounted GPS receiver, and a rebroadcast transmitter can be used. The portable receiver 16 is surveyed in place at or near site 12 as previously discussed.

Also shown in schematic form on the compactor 10 of FIG. 4 is an on-board digital computer 20 including a dynamic database and a color graphic operator display 22. Computer 20 is connected to receiver 18 to continuously receive compactor position information. Although it is not necessary to place computer 20, the dynamic database and the operator display on compactor 10, this is currently a preferred embodiment and simplifies illustration.

In the illustrated embodiment of FIG. 4, the machine-mounted position receiver 18 is positioned on the cab of compactor 10 at a fixed, known distance from the ground-engaging portions or "footprints" of the compactor wheels. Since the wheels are actually in contact with the site topography, receiver 18 is calibrated to take this elevational difference into account; in effect, the cab-mounted receiver 18 is perceived by the system as being level with the site topography over which the compactor is operating.

While the use of a single position receiver 18 at a fixed distance from the compactor's site-contacting wheels is an effective and sturdy mounting arrangement, in certain applications it may be preferable to use different mounting arrangements for the positioning receiver. For example, the current direction of the compactor relative to the site plan, as shown on display 22 by icon 82 and direction indicator 84 in FIG. 6A, may be off by a slight time lag vector, depending on the sampling rate of the receiver 18 and the machine's rate of directional change. With only one position receiver 18 mounted on tractor 10, machine direction at a single point cannot be determined since the machine effectively pivots around the single receiver. This problem is solved by placing a second position receiver on the machine, spaced from the first, for a directional reference point.

Additionally, the lengthwise distance between the wheels 26, 28 and the cab-mounted GPS receiver 18 in FIG. 4 creates a slight real time offset in resolving the position of the wheels as they compact the site. In most cases this delay is negligible, since the GPS position closely precedes or follows the wheels and essentially matches the compacting operation. On larger machines, however, it may be preferable to mount one or more position receivers 18a directly in line with one or more of the wheels as shown in FIG. 4 in phantom.

Figure 5A:
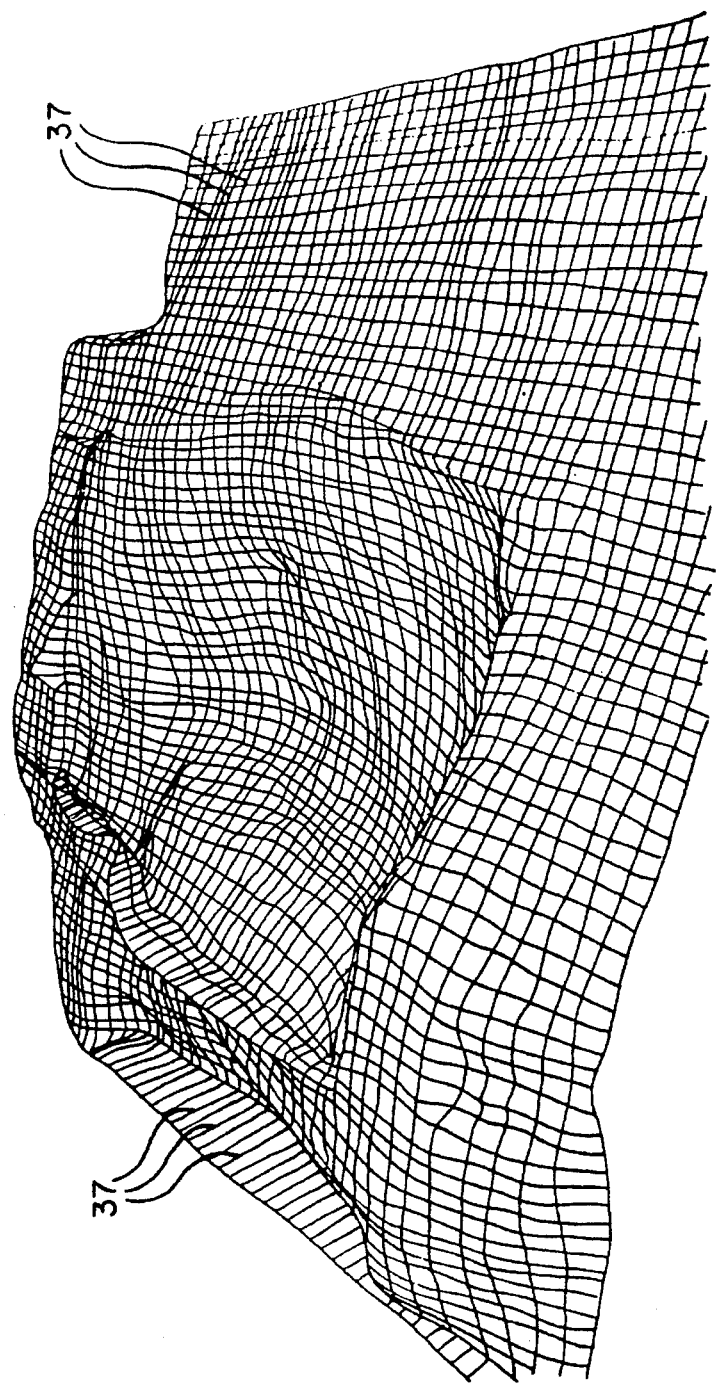
FIGS. 5A–5B are graphic reproductions of exemplary topographical landfill site models such as used with the present invention.
Figure 5B:
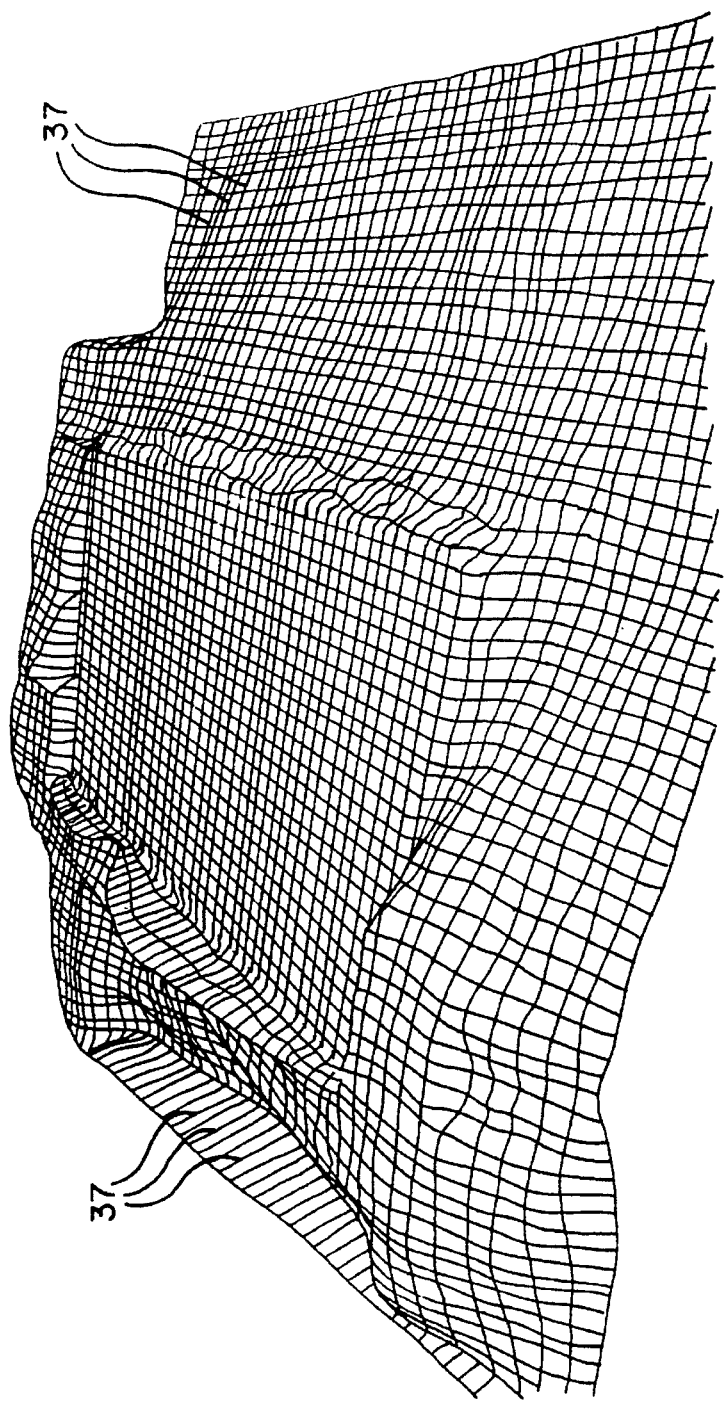

Referring to FIGS. 5A–5B, an illustrative landfill site has previously been surveyed to provide a detailed topographic blueprint (not shown) showing the initial landfill topography in plan view. The creation of topographic blueprints of sites such as landfills and construction sites with optical surveying and other techniques is a well-known art; reference points are plotted on a grid over the site, and then connected or filled in to produce the site contours on the blueprint. The greater the number of reference points taken, the greater the detail of the map.

Systems and software are currently available to produce digitized, two- or three-dimensional maps of a topographic site. For example, the topographic blueprint can be converted into a three-dimensional digitized model of the initially surveyed landfill topography as shown at 36 in FIG. 5A and of a subsequent site topography, for example after the landfill has been substantially filled in, as shown at 38 in FIG. 5B. The site contours can be overlaid with a reference grid of uniform grid elements 37 in known fashion. The digitized site plans can be superimposed, viewed in two or three dimensions from various angles (e.g., plan or profile), and color coded to designate areas in which the site needs to be filled in or compacted.

However the site is surveyed, and whether the machine operators and their supervisors are working from a paper blueprint or a digitized site plan, the prior practice is to simply add material to the landfill and monitor the compacting operation by feel, memory and/or physical markers. Periodically during this process the operator's progress may be manually checked to coordinate the compacting operations in static, step-by-step fashion until uniform, satisfactory compaction is achieved. This manual periodic updating and checking is labor-intensive, time consuming, and inherently provides less than ideal results.

Moreover, when it is desired to revise the blueprint or digitized site model as an indicator of progress to date and work to go, the site must again be statically surveyed and the blueprint or digitized site model manually corrected off-site in a non-real time manner.

To eliminate the drawbacks of prior art monitoring and static surveying and updating methods, the present invention integrates accurate three-dimensional positioning and digitized site mapping with a dynamically updated database and operator display for real-time monitoring and control of the site 12 and compactor 10. The dynamic site database determines the difference between the actual and desired site models in terms of degree of compaction of the site topography, receives kinematic GPS position information for compactor 10 relative to site 12 from position receiver 18, displays both the site model and the current machine position to the operator on display 22, and updates the actual site model, machine position and display in real time with a degree of accuracy measured in centimeters. The operator accordingly achieves unprecedented knowledge of and control over the compacting operations in real time, on-site, and can accordingly finish the job with virtually no interruption or need to check or resurvey the site.

Referring now to FIGS. 6A–6B and 7A–7I, an application of the present invention is illustrated for a landfill compacting operation.

In machine compacting, for example of landfills, earth, or freshly laid asphalt, the completion of the compacting operation is typically a function of the number of passes of the compactor over the surface to be compacted. The desired degree of compaction can be determined, for example, by running a compactor over a test area of uncompacted material and empirically determining a suitable pass-count standard. By way of illustrative example, in a landfill compacting operation it is desirable that a machine such as a large, heavy compactor with studded rollers or wheels pass over a portion of the landfill to compress new refuse to some predetermined degree in accordance with local compaction regulations or sound compacting practices. It is therefore important for the operator of the compactor to know: whether he has been over a given unit area or grid element of the landfill site; how many times the compactor has been over a given grid element on the site; the extent to which the material has been successfully compacted within a grid element on the site; and, whether uncompacted material has been added to a particular grid element since the last compacting pass.

At the start of the compacting operation, the actual site model may initially comprise a three-dimensional survey or map of the site topography in an uncompacted state, for example the digitized three-dimensional site model of FIG. 5A for a landfill application. As compacting operations progress, the actual site model more specifically comprises the actual degree of compaction of the material on the surface of the site, as measured for example by compaction pass count and/or elevation change. The actual site model is dynamic in that it changes each time new material is added or old material is further compacted from its previous state.

Figure 9:
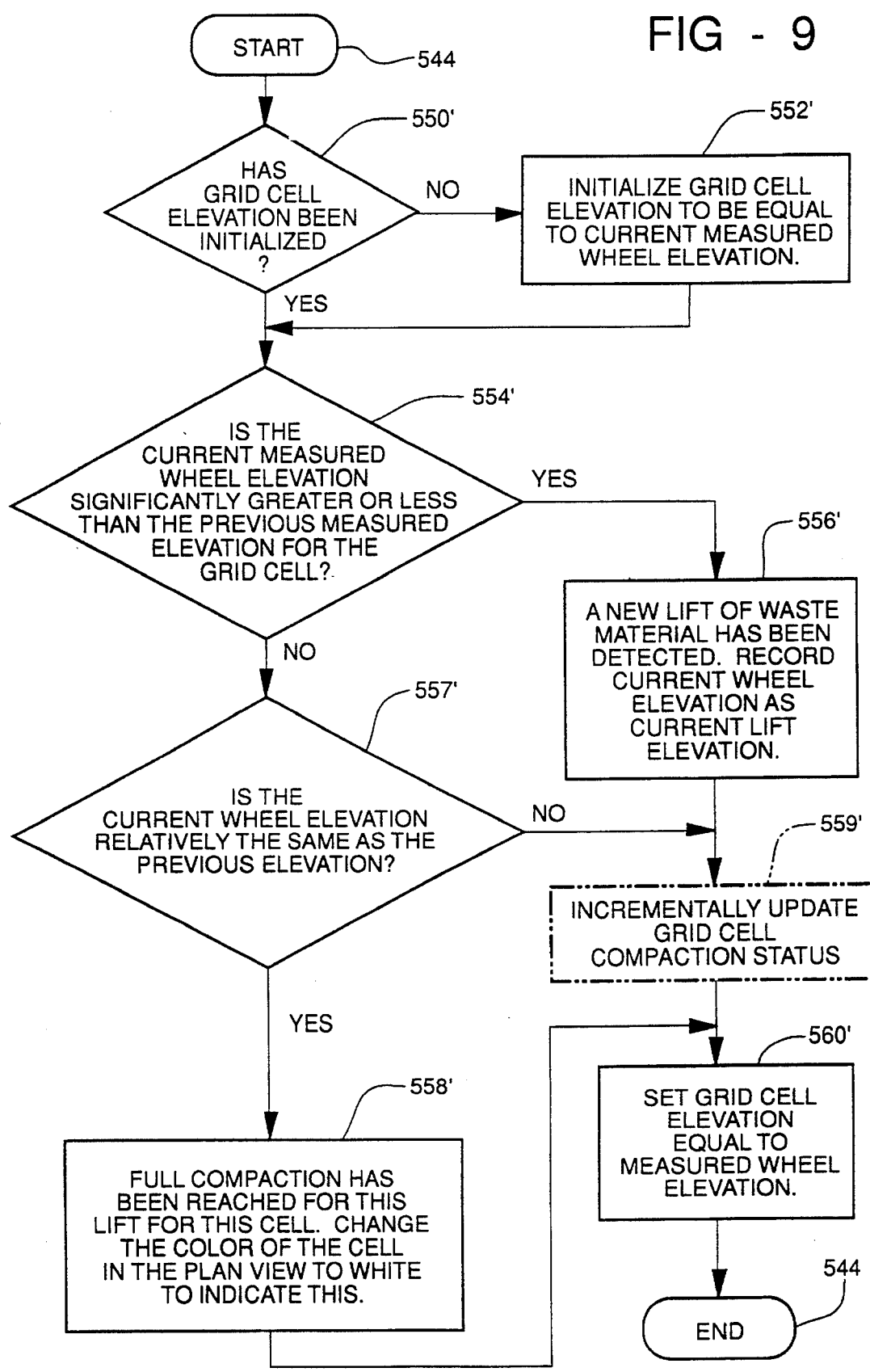
FIG. 9 is a flowchart representation of a method according to the present invention for monitoring the degree of compaction of a site by sensing a relative degree of compaction based on elevation change.

The desired site model comprises a predetermined, desired degree of compaction for material on the surface of the site. For example, in the illustrated embodiment of FIGS. 7A–7I the desired degree of compaction is predetermined to be a total of five passes of the compactor over a previously uncompacted area, and the desired site model is a pass count of five passes over a previously uncompacted area. When that pass count is reached, the desired site model is achieved. In FIG. 9 an alternate method is illustrated where the desired degree of compaction is predetermined to be a relative degree of compaction, based on the change in elevation effected by a compaction pass. The difference between the actual and desired site models at any point on the site comprises the difference between the actual degree of compaction and the desired degree of compaction at that point.

The actual site model accordingly fluctuates between an uncompacted state of the site material and the desired degree of compaction. Whenever new, uncompacted material is detected in a previously compacted area of the site, the actual site model returns or decrements to an uncompacted state for that area.

Using the method and apparatus of the present invention, all of this information can be determined and updated in real time, with a great degree of accuracy and with a user-friendly display for the operator.

Figure 6A:
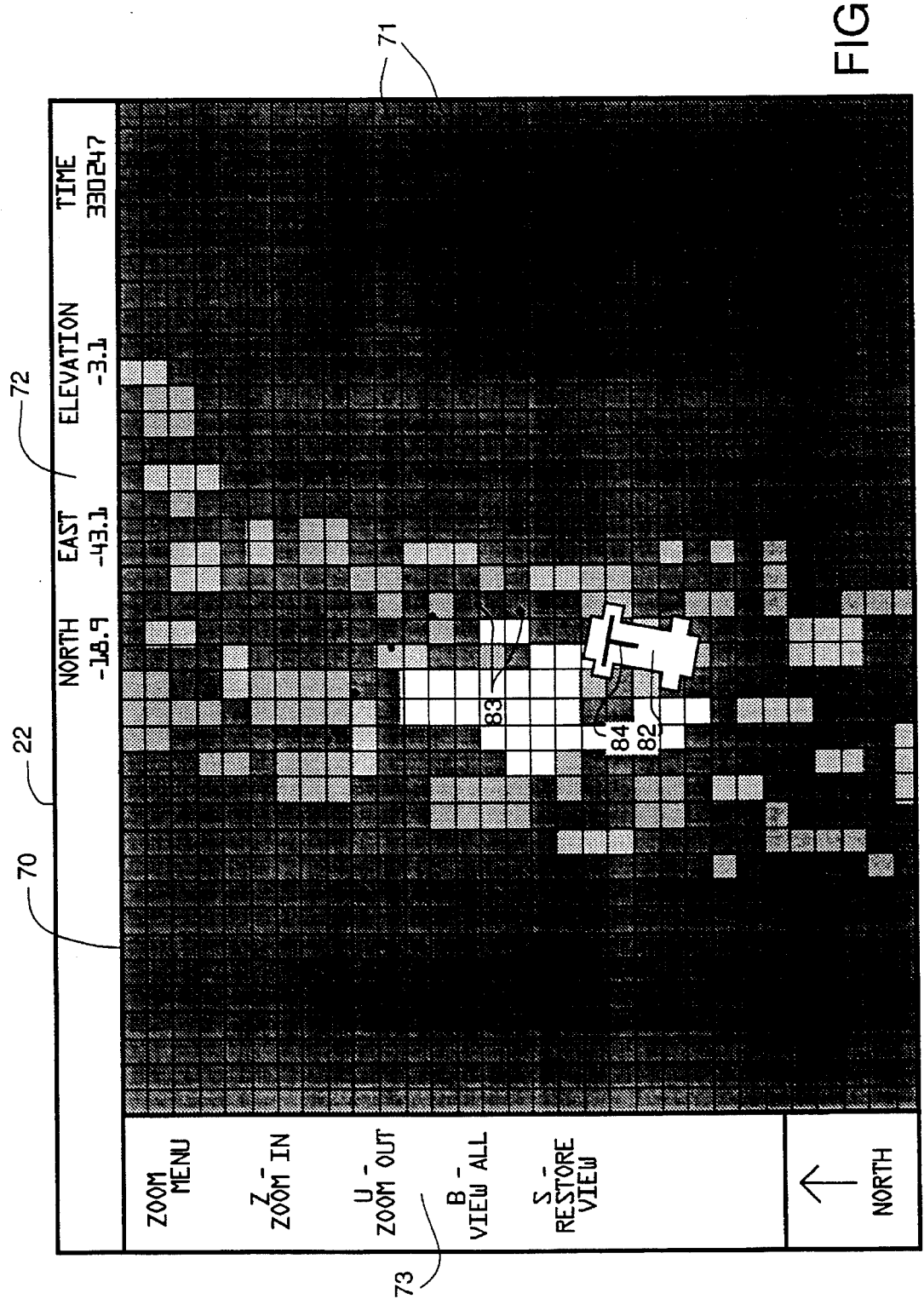
FIGS. 6A–6B are representative real-time operator displays generated according to the present invention for a landfill compacting operation.

FIG. 6A shows a sample operator display 22 for a compacting operation according to the present invention. Using a digitized model of the landfill site with a superimposed set of grid elements, and a compactor equipped with position module 50 and update/control module 60 in FIG. 3, the operator first initializes the operator display 22, typically upon entering the landfill site. In landfill compacting the probable activity field for a day is typically small, on the order of a few hundred or thousand square meters. For purposes of illustration in FIG. 6A the site database is arbitrarily set at approximately 30 meters by 40 meters. This can be varied depending on the nature of the particular compacting operation. This is smaller than the total area of a typical landfill, but for a single day the compactor operator needs a database only for the portion of the landfill in which he will be operating.

In a large landfill application, individual site databases can be parceled out to each operator at the beginning of a day, the updated databases for each portion of the landfill gathered at the end of the day and recorrelated relative to the overall landfill for the next day's work.

In the illustrated embodiment the system arbitrarily assumes upon start up and initialization that the compactor is in the center of the site, divided into a grid of squares of fixed area, e.g., one square meter. The operator can center the compactor with respect to the designated site either by driving to a designated central marker, or using GPS or similar positioning techniques.

Once arrived at the center of the site, the operator initializes the display and is presented on screen 22 with a site database in plan window 70 such as that shown in FIG. 6A, marked off in a grid pattern of elements 71 initially all one color; e.g., black to indicate that no passes have yet been made over that site. A position coordinate window 72 displays the compactor's current position in latitude, longitude, elevation and time. A menu window 73 displays zoom options in the display software which allow the operator to expand or contract the amount of the site displayed in plan window 70. The compactor position is denoted by an icon 82 with direction indicator 84.

Prior to the beginning of work on the site, a compaction standard is set to denote the desired degree of compaction of the site. For example, it may be determined that five passes of the compactor over uncompacted material on any one grid element are necessary for that grid element to be adequately compacted. As the operator traverses the site, each pass of the compactor wheels over a grid element will result in a database update in real-time. The grid elements of the site display can be visually updated in a variety of ways to show the difference between the actual and desired degree of compaction, e.g., shading, cross-hatching, coloring or "painting" (where a color display is used), or in any other known manner to provide an indicator to the operator of the compaction status of the grid elements. In the illustrated embodiment of FIG. 6A the grid changes color to denote the actual degree of compaction in terms of how many passes have been made; e.g., the darkest to lightest shading of grid elements 71 can represent black for no passes, yellow for one pass, green for two passes, red for three passes, blue for four passes, and white indicating satisfactory compaction at five passes. The objective is to make the entire screen white as the operator display is updated in real-time to indicate the number of passes over each grid element.

The illustrative display of FIG. 6A can also be used where the compaction standard is based on change in elevation rather than pass count, with the grid cells updated according to changes in elevation as the compactor passes over them.

As an additional aid to the operator, the approximate path of the compactor as measured by coordinate samples can be shown on display 22, in FIG. 6A denoted by a series of dots 83 where each position reading was taken.

Figure 6B:
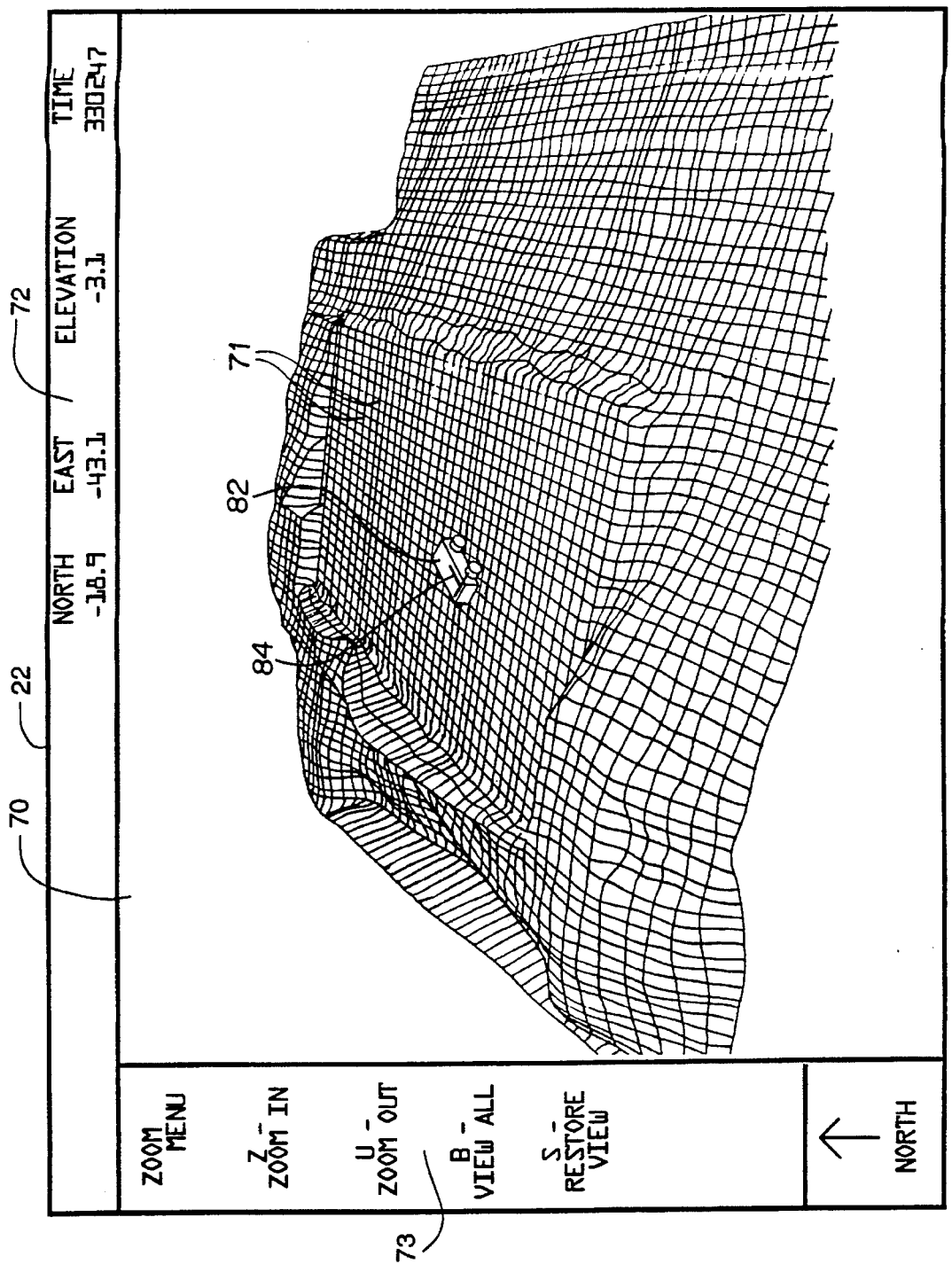

FIG. 6B is one possible alternate display in which the two-dimensional plan view of the site and compactor position of FIG. 6A is shown in three dimensions in window 70.

It is necessary to provide some protocol for determining when a sufficient portion of a grid element has been passed over by a compactor wheel to warrant a status update for that grid element and register a compacting pass on the operator display. For the illustrated compactor with two or more spaced compacting wheels, the following illustrative method can be used. The size of each grid element on the digitized site plan is preferably matched to the width of a compacting wheel; e.g., for one meter wide wheels the grid elements should be set to one square meter. Accordingly, if the center of the wheel crosses a grid element at any point, it is assumed that at least one half of the grid element has been compacted and can be updated on the display. These dimensions and margins can be varied as desired, however.

The coordinates of the ground-contacting surfaces ("footprints") of the fixed rear compactor wheels are known relative to the position receiver on the compactor. Each coordinate sampling by the positioning system can accordingly be used to determine the precise location of the center of each wheel at that point.

In the illustrated embodiment the positions of the footprints of the rear compactor wheels are tracked, since in a typical compactor the rear compacting wheels are fixed relative to the cab and position receiver 18. Moreover, compactors often operate in a substantially linear, back and forth manner over the site, without sharp turns which would tend to disturb previously compacted material. The paths of the evenly-spaced front and rear wheels essentially overlap, such that the compacting path of the front wheels can be accurately estimated by the paths of the fixed rear wheels.

The time lag between coordinate samplings as the compactor wheels travel over several grid elements must also be taken into consideration to accurately determine the entire real-time path of the compactor. In a compactor with compacting wheels whose width approximates the width of the site model grid elements, a preferred method shown in the illustrated embodiment of the present invention uses the well-known Bresenham's algorithm to produce a continuous line approximating the path of each compactor wheel over the grid elements between coordinate samplings. Then, if the sampling rate only provides a coordinate "point" every three or four grid elements, a line approximation is made of the compactor wheel paths over those three or four grid elements (corresponding to the center of the wheels), and every grid element along that line is given a status update and visual change on the operator display.

Figure 7A:
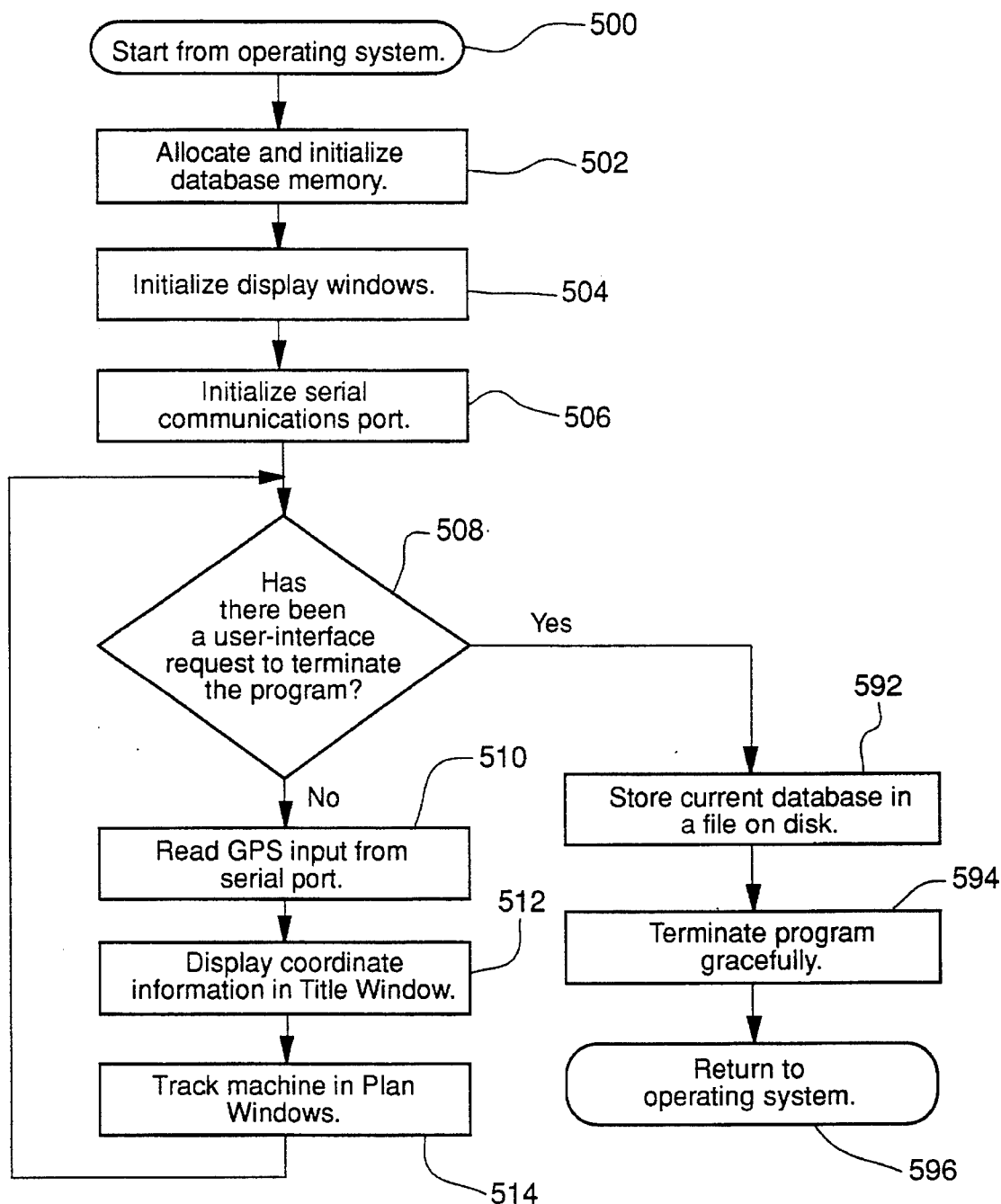

Referring to FIG. 7A, the method of the present invention as applied to a landfill compacting application is schematically shown. At step 500 the operator starts from the computer operating system. At step 502 database memory is allocated and initialized. At step 504 the various displays are initialized. In step 506 the serial communications port between the positioning module and update/control module is initialized. At step 508 the system determines whether there has been an operator request to terminate the program, for example from a user interface device such as a computer keyboard. This option is available to the operator at any time, and if the system determines that such a request to terminate has been received, it proceeds to step 592 and stores the current site database in a file on a suitable memory device, for example a disk. At steps 594, 596 the operator is returned to the computer operating system.

If, however, the system determines at step 508 that there has not been a request to terminate the program, it proceeds to step 510 where a position coordinate is read from the serial port connection between the position module 50 and update/control module 60 of FIG. 3, in the illustrated embodiment a three-dimensional GPS-determined coordinate point. At step 512 the position of the compactor is displayed (FIG. 6A) in window 72 on operator display screen 22 as three-dimensional coordinates relative to base reference 16.

For the first system loop at step 514 the position of the compactor is initially displayed on the operator screen 22 as icon 82 in the middle of the plan display 70. In the illustrated embodiment of FIG. 6A the site database displayed at 70 is approximately 30×40 meters, the compactor has two separate rear compacting wheels, each wheel one meter wide, and the grid element size is fixed at one square meter.

Figure 7B:
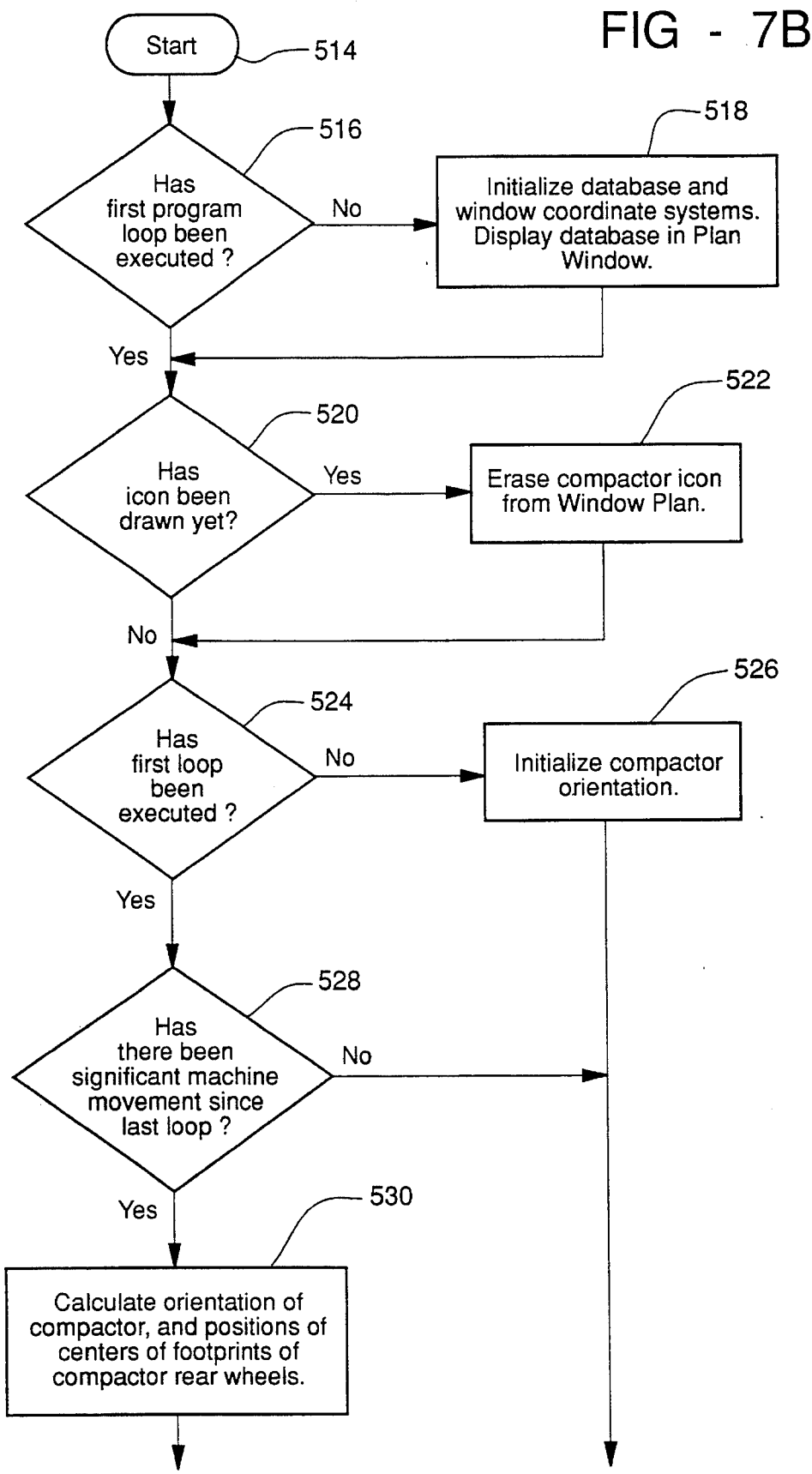
Figure 7C:
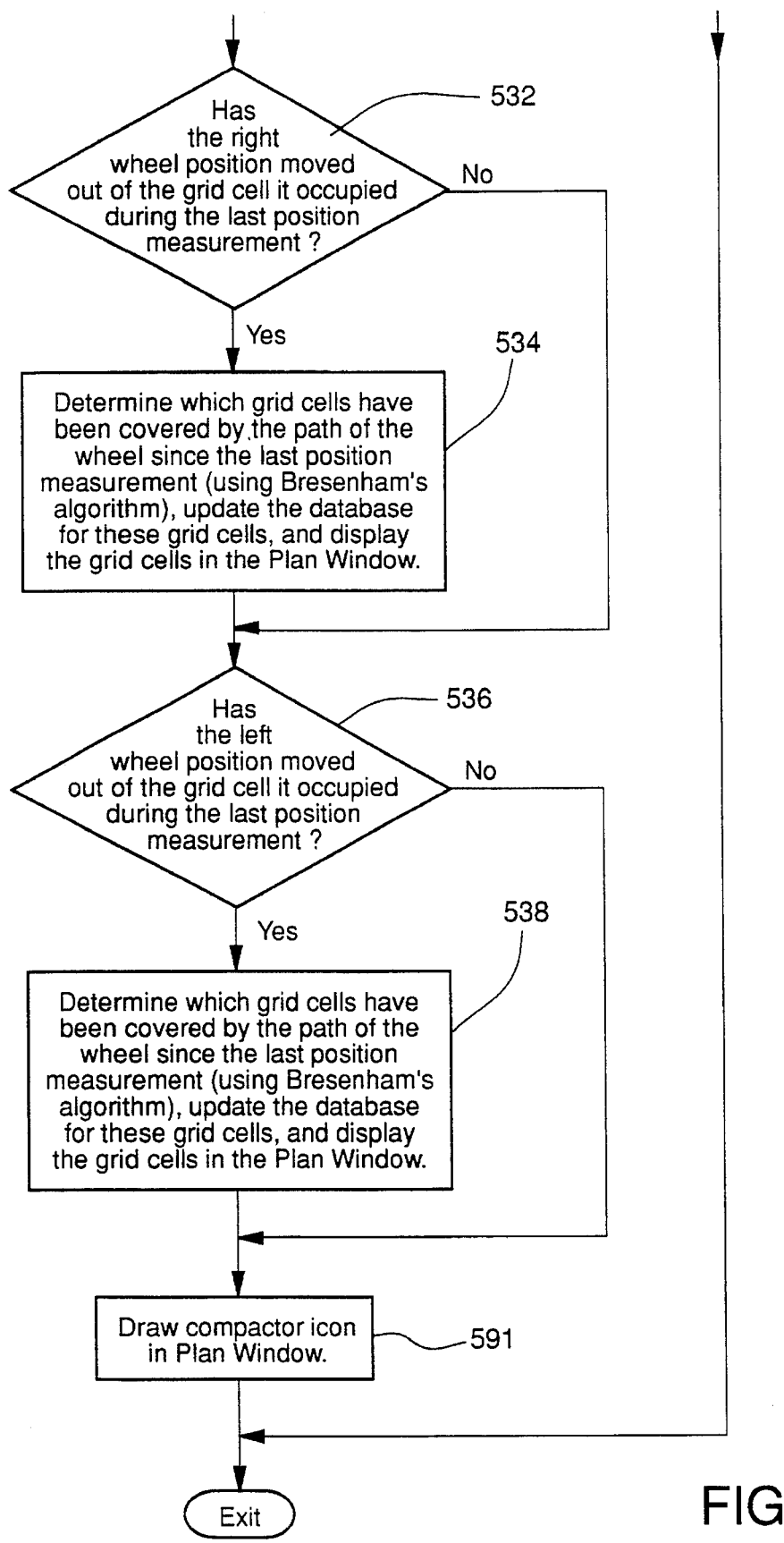

In step 514 a subroutine shown in FIGS. 7B–7C draws the displays and icon, determines the orientation of the compactor and the position of the centers of the "footprints" or ground-contacting portions of the rear compactor wheels, tracks the path of the rear compactor wheels over the site database, and updates the compaction status of the grid elements in the path of the compactor.

Referring to FIG. 7B, at step 516 the system determines whether the first program loop has been executed. If not, the site database and display window coordinate systems are initialized and displayed on operator screen 22 at step 518.

After the first program loop has been executed and the site database initialized and displayed on the operator screen, the system at step 520 checks whether icon 82 has already been drawn. If yes, the previous icon 82 is erased from the display at step 522. If the icon has not yet been drawn, at step 524 the system determines whether the first loop has been executed; if not, the orientation of the compactor is initialized at step 526 and the system completes the overall program loop of FIG. 7A. If at step 524 the system determines that the first loop has already been executed, the system proceeds in FIG. 7B to step 528 to determine whether the compactor has moved since the last program loop. If the machine has not moved, the system exits the subroutine of FIG. 7B and returns to complete the overall program loop of FIG. 7A from step 514.

If the machine has moved relative to the site database since the last loop, the system proceeds to step 530 in FIG. 7B to calculate the positions of the centers of the footprints of the rear compactor wheels, and from those the orientation of the compactor. At step 532 in FIG. 7C the system determines whether the right rear compactor wheel position has moved out of the grid element it occupied during the last position measurement. If it has, at step 534 the path of the right wheel between the previous and current coordinate samplings is determined using the well-known Bresenham's algorithm to approximate a continuous line path of the right wheel over the grid elements on the display 22. The grid elements of the site database over which the right wheel has passed are then updated to indicate a compaction pass, and grid elements are updated on the visual display window 70 with a color change or other visual indicator in accordance with the compaction standard being used.

If at step 532 the right wheel has not moved since the last position measurement, or after the movement of the right wheel has been tracked and the site database updated at step 534, the process is repeated for the left wheel of the compactor at steps 536, 538. At step 591 the updated compactor icon is then redrawn on the display to show its current position and direction. The subroutine of step 514 is then completed, and the system returns to repeat the program loop of FIG. 7A, either proceeding to step 510 for another GPS coordinate sampling, or terminating in response to an operator request.

Figure 7D:
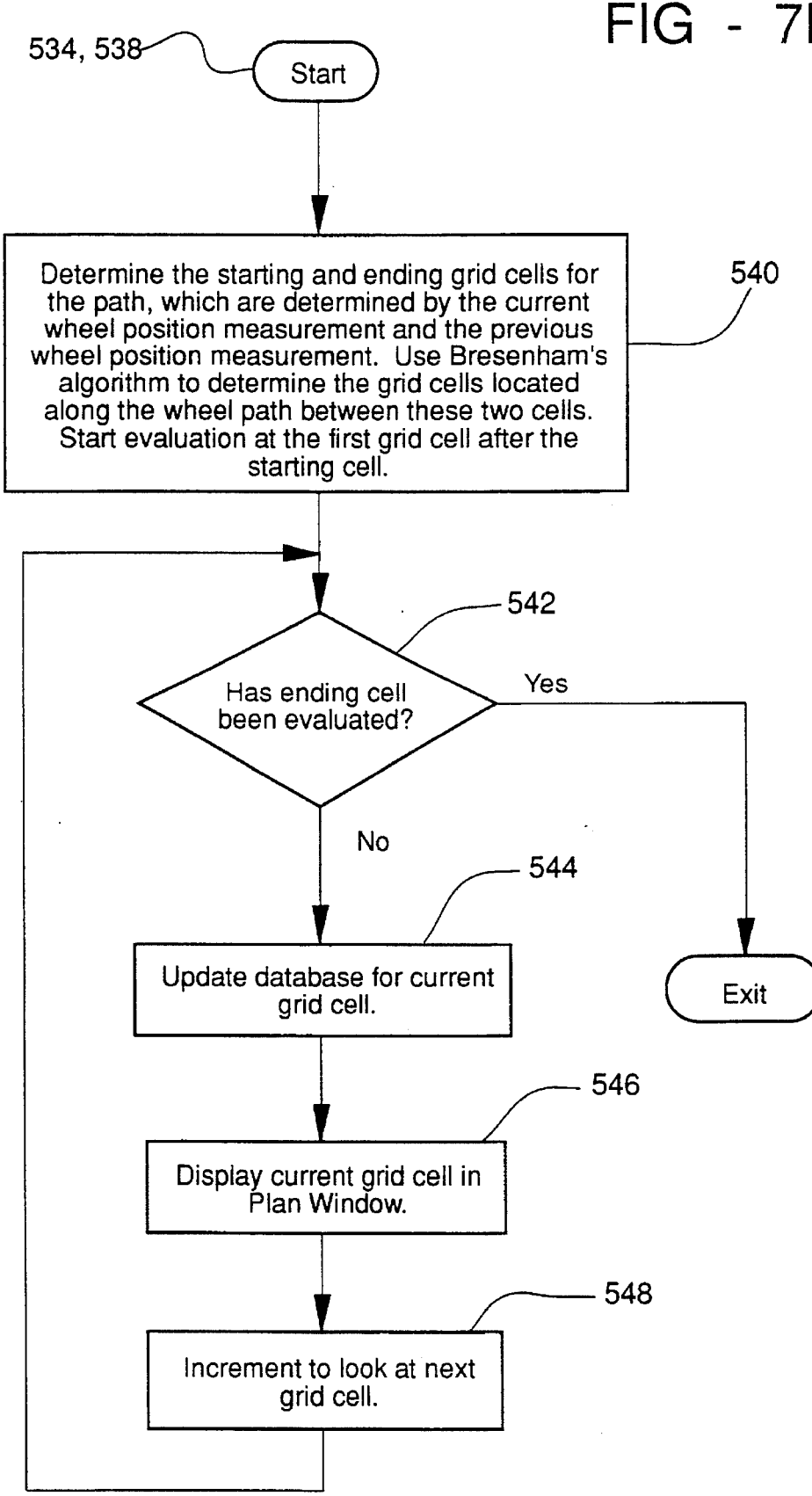
Figure 7E:
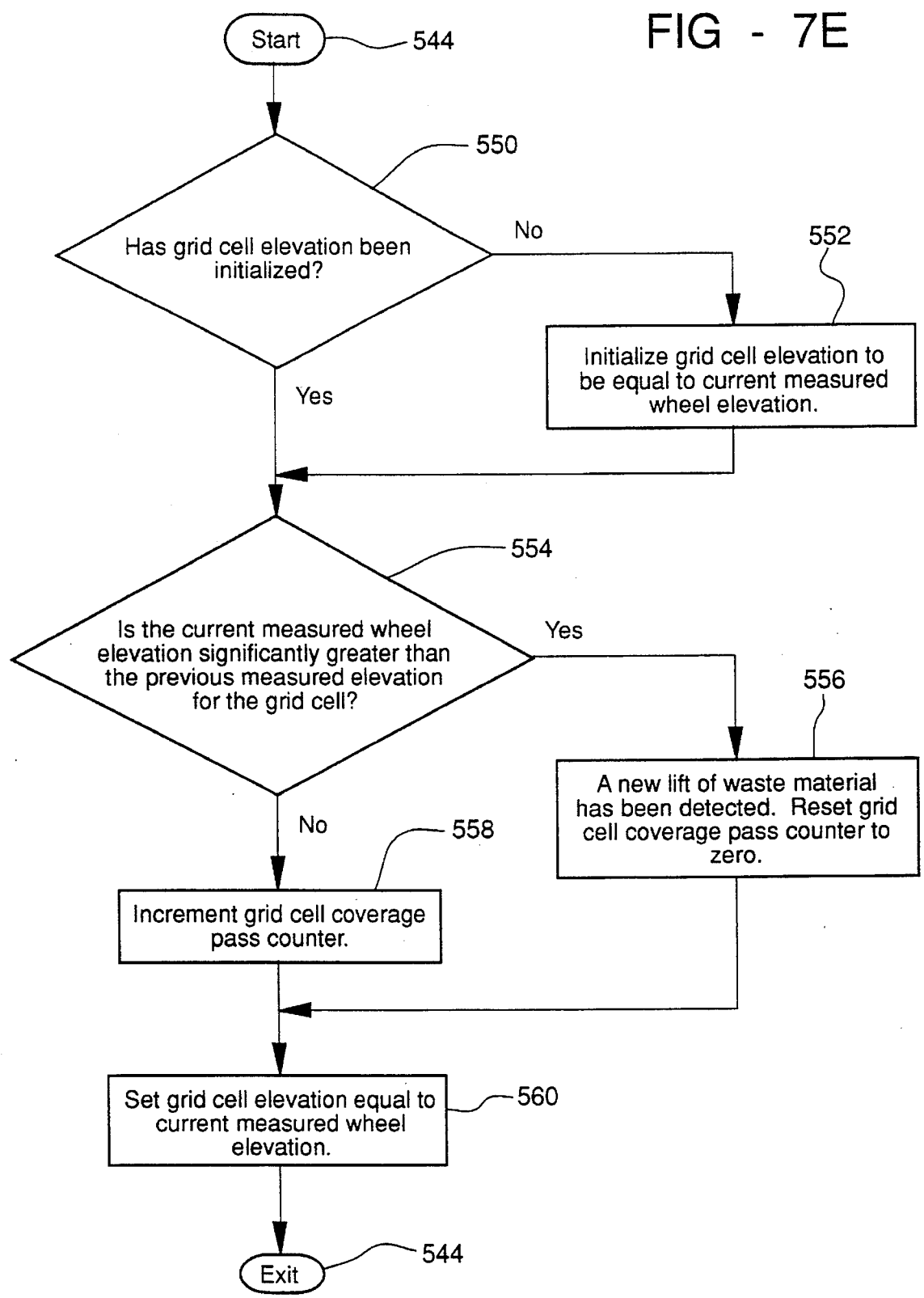

In FIG. 7D a subroutine for the wheel tracking and site updating operations of steps 534 and 538 is shown. At step 540 the starting and ending grid cells for the wheel whose path is being determined are defined by the current wheel position measurement and the previous wheel position measurement taken by the GPS or other positioning system. The Bresenham's algorithm is applied to determine the grid cells located along the path between the starting and ending grid cells, and the system proceeds to steps 544, 546, 548 to evaluate/update the status of each grid element therebetween, beginning with the first grid element after the starting grid element. At step 542 the system determines whether the ending grid element has been evaluated; if not, it proceeds to step 544 where the grid element being evaluated is updated according to a subroutine in FIG. 7E, illustratively for a pass count based update. Once the compaction status of the current grid element has been updated at step 544, the updated grid element is displayed on the operator screen 22 at step 546, and at step 548 the system is incremented to evaluate the next grid element in the path between the starting and ending grid elements. This loop repeats itself until the ending grid element has been evaluated and updated, at which point the subroutine of FIG. 7D is exited and the program returns to step 591 in FIG. 7C to draw the updated compactor icon on the display.

While FIG. 7E illustrates a pass count based method for the site database update step 544 of FIG. 7D, other methods for determining and updating the compaction status of the grid elements can be used. FIG. 9 illustrates an alternate method for updating the site database at step 544 of FIG. 7D using a compaction standard based on relative elevation change, and is discussed in further detail below.

Referring to FIG. 7E, at step 550 the system determines whether the elevation of the current grid element has been initialized. If not, the elevation or z-axis coordinate of that grid element is initialized as equal to the currently measured compactor wheel elevation at that point. If the grid element elevation has already been initialized, the system proceeds to step 554 to compare the currently measured wheel elevation to the previously measured elevation for that grid element. If the currently measured wheel elevation on that grid element is not greater than the previously measured elevation, the system determines that no new material has been added and that grid element can be incremented at step 558 to register a compaction pass and increment the pass count for that grid element. If at step 554 the currently measured wheel elevation is greater than the previously measured elevation (discounting, for example, minor resilient expansion of the material compressed in the last pass, within limits determined by the user) the system determines at step 556 that a new lift of asphalt, earth or waste material has been detected for that grid element, and the pass count status for that grid element is re-zeroed to indicate the need for a complete new series of compaction passes. At step 560 the elevation of the current grid element is then set equal to the currently measured elevation of the compactor wheel for comparison at step 554 on the next pass of the compactor over that grid element. The subroutine of FIG. 7E is then exited for completion of the subroutine loop of FIG. 7D.

Figure 7F:
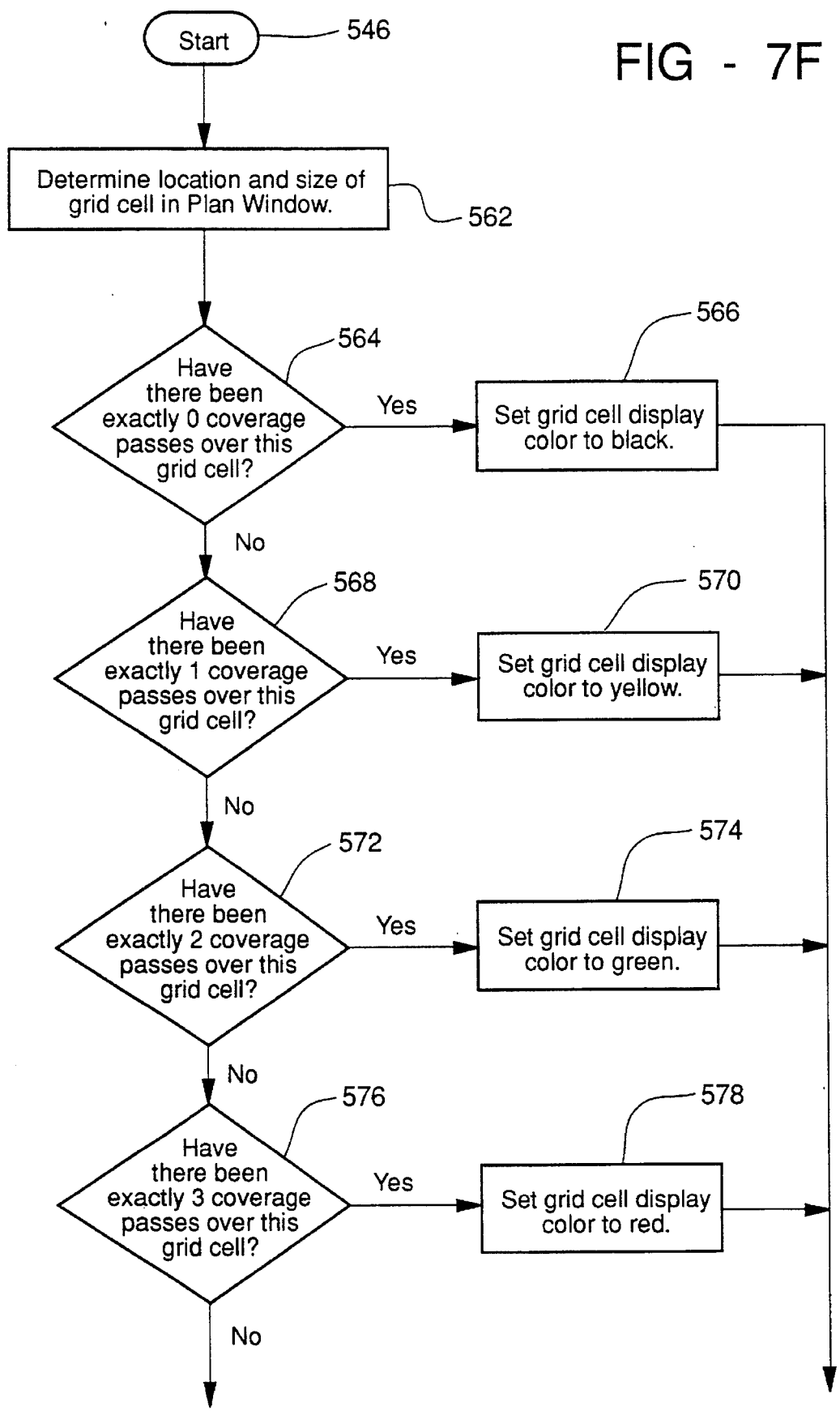
Figure 7G:
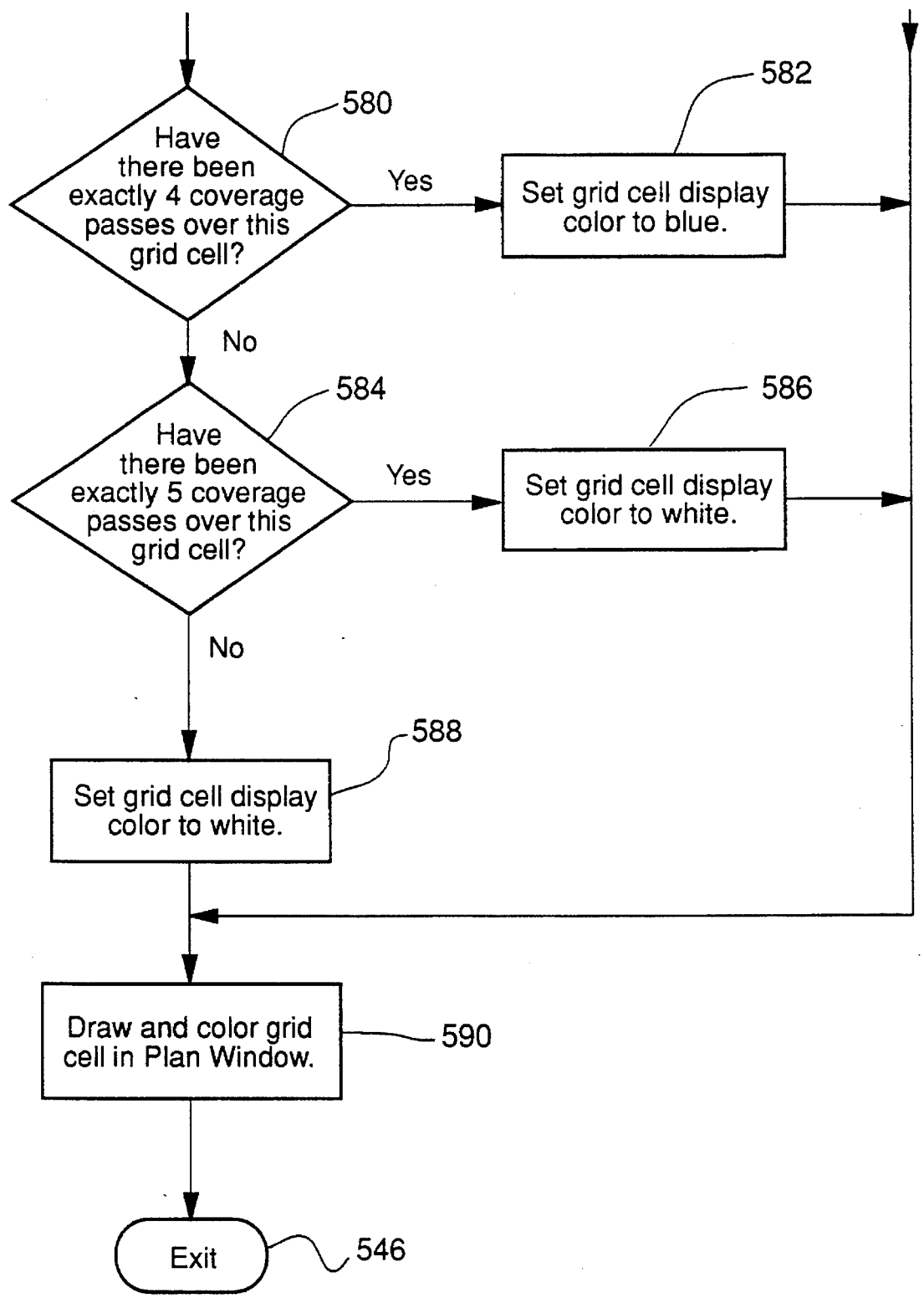

Referring now to FIGS. 7F–7G, a subroutine for step 546 of FIG. 7D is shown. Once the pass count for the current grid element has been updated at step 544 in FIG. 7D using the subroutine of FIG. 7E, the system in step 546 enters the subroutine of FIGS. 7F–7G and at step 562 first determines the location and size of the current grid element on the site database displayed in plan window 70 on the operator screen 22. At step 564, if the pass count for the grid element is zero, the grid element is set, for example, to be colored black on the display at step 566. If the pass count for that grid element is determined to be one at step 568, the grid element is set, for example, to be colored yellow on the display at step 570. If the pass count for that grid element is determined at step 572 to be two, the grid element is set, for example, to be colored green at step 574. If the pass count is determined at step 576 to be three, the grid element is set, for example, to be colored red at step 578. If the pass count for that grid element is determined at step 580 to be four, the grid element is set, for example, to be colored blue at step 582. If the pass count is determined at step 584 to be five (in the illustrated embodiment the desired pass count for a completed compacting operation), the grid is set, for example, to be colored white at step 586. If the pass count for that area is greater than the minimum pass count for a completed compaction operation, the grid element is set to be colored white at step 588.

Once the grid element has been updated according to the current pass count, the grid element is drawn and colored on the operator display screen 22 at step 590. It will be understood that the grid elements can be visually updated on screen 22 other than by coloring; e.g., by cross-hatching, shading or other visual indication.

While the tracking and updating method of FIGS. 7A–7G are illustrated for a compactor having two or more spaced compacting wheels whose width approximates the width of the site grid elements, the method can also be used for a compactor with a single wheel or roller as will be understood by those skilled in the art. The method of FIGS. 7A–7G can also be used where the width of the compactor wheel or roller does not match the width of the grid elements of the site model. However, where the width of the compacting wheel or roller is significantly greater than the width of a single grid element, for example where it covers several grid elements at one time, an alternate method for tracking the path of a compacting wheel or roller may be employed.

Figure 7H:
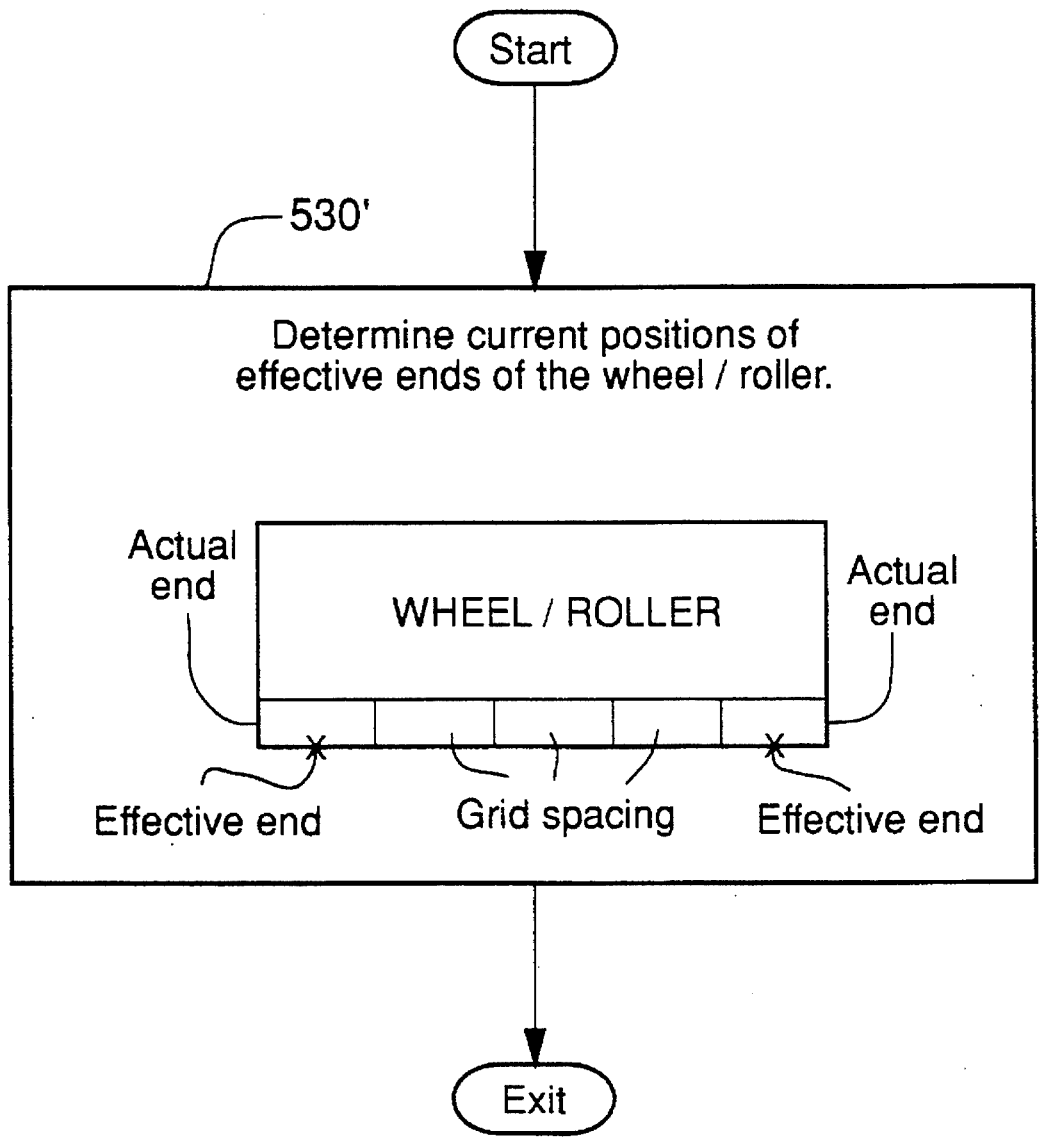
Figure 71:
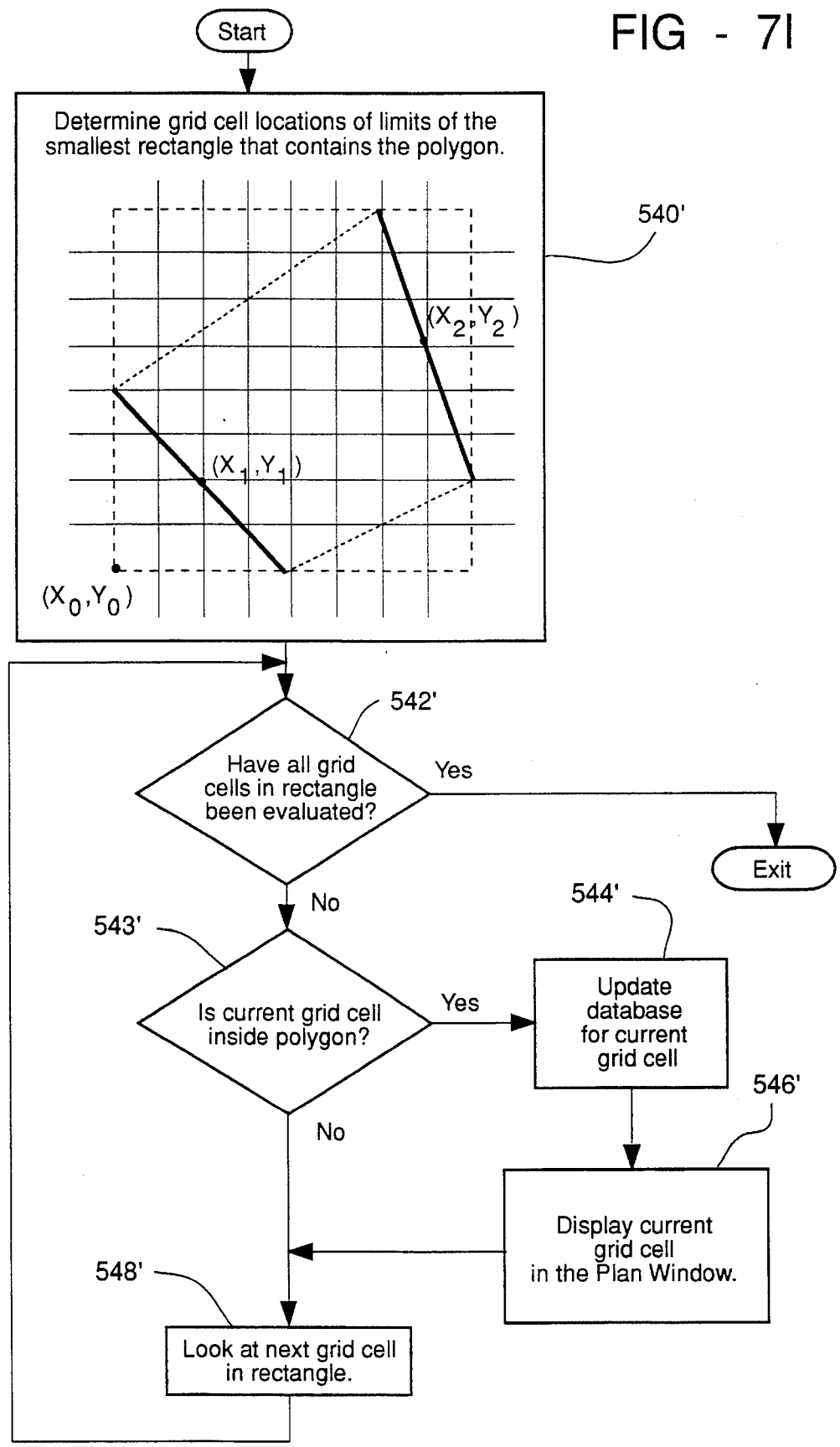

This is accomplished by replacing step 530 in FIG. 7B with step 530' from FIG. 7H, and the subroutine of FIG. 7D with the subroutine of FIG. 7I. Referring to step 530' in FIG. 7H, the system designates "effective" wheel or roller ends inboard from the actual ends. In the illustrated embodiment the effective ends are recognized by the differencing algorithm as inboard from the actual end a distance approximately one half the width of a grid element. For example, if the actual wheel width is 5.0 feet, corresponding to five 1.0 foot×1.0 foot grid elements, the effective locations of the wheel ends can be calculated, for example, one half foot inboard from each actual end. If the effective (non-actual) wheel ends of the compactor pass over any portion of a grid element on the digitized site model, that grid element is read and manipulated by the differencing algorithm as having been compacted, since in actuality at least one half of that grid element was actually passed over by the wheel. Of course, the amount of wheel end offset can vary depending on the size of the grid elements and the desired margin of error in determining whether the wheel has passed over a grid element.

While the algorithm of step 530' in FIG. 7H compensates for the lack of complete correspondence between the width of the compacting wheel or roller and the number of grid elements completely traversed by the wheel or roller, the distance and direction changes which the wheel makes between GPS position readings results in a loss of real time update information over a portion of the compactor's travel. This is particularly acute where compactor travel speed is high relative to the grid elements of the site plan. For example, where the grid elements are one meter square and the sampling rate of the position system is one coordinate sample per second, a machine traveling at 18 km per hour travels approximately five meters or five grid squares between position samplings. Accordingly, there is no real time information with respect to at least the intermediate three of the five grid squares covered by the machine. To solve this problem a "fill in the polygon" algorithm as shown in FIG. 7I is used to estimate the path traversed by the machine between coordinate samplings. In FIG. 7I the algorithm at step 540' locates a rectangle on the site plan grid surface defined by the effective ends of the compactor wheel at positions ($x_1$, $y_1$) and ($x_2$, $y_2$) and coordinate position ($x_0$, $y_0$). At steps 542', 543' and 548' a search algorithm searches within the rectangle's borders for those grid elements within a polygon defined between the two wheel positions; i.e., those grid elements traversed by the wheel between its effective ends.

At steps 544' and 546' the database and display are updated as described at steps 544 and 546, respectively, in FIGS. 7D–7F.

While the illustrated embodiment of FIGS. 7A–7I described above uses a pass-count based compaction standard, it will be apparent that other update protocols can be employed. For example, the change in amount of compaction per pass over a grid element can be determined by checking the elevation change since the last pass, and when the change in elevation on a particular pass is below a certain value (indicating that the garbage is near the desired compaction density), that grid element is updated on the screen as completed. Another method is to use an absolute compaction standard, registering a particular grid element as finished when the material thereon has been compacted from an uncompacted or initial elevation to a predetermined lower elevation.

Referring now to FIG. 9, an alternate method for updating the site database at step 544 in FIG. 7D is illustrated using a relative degree of compaction standard based on elevation change. The method illustrated in FIG. 9 can be used with the method illustrated above in FIGS. 7A–7I by substituting the subroutine of FIG. 9 for the subroutine illustrated in FIG. 7E.

The change in degree of compaction per pass over a grid element is determined by sensing the elevation change since the previous pass. When the change in elevation on a particular pass falls below a certain value (indicating that the site material is at or near the desired compaction density), that grid element is updated as having been fully compacted. The exemplary method illustrated in FIG. 9 does not require the multi-step pass count incrementing and site updating shown in the pass count based method of FIGS. 7E–7G; instead, the status of individual grid elements on the site is simply updated from an uncompacted to a fully compacted state when a lift of material has been compacted to the point where the elevation change on a given pass falls below the predetermined standard, for example a few inches or centimeters. However, it is possible and within the scope of the invention to incrementally update the site database in FIG. 9 for various stages of partial compaction between the uncompacted and fully compacted states. Another possible variation is to complement the elevation-based update of FIG. 9 with a pass count as disclosed in FIGS. 7E–7G.

At step 550' in FIG. 9, the system determines whether the elevation of the current grid element has been initialized. If not, the elevation or z-axis coordinate of that grid element is initialized at step 552' as being equal to the currently measured compactor wheel elevation. If the grid elevation has already been initialized, the system proceeds to step 554' to compare the currently measured wheel elevation to the previously measured elevation for that grid element.

If the currently measured wheel elevation for that grid element is not significantly greater or less than the previously measured elevation, the system determines that no new material has been added. For example, where the complete compaction of previously uncompacted lift material has been empirically determined to result in a total elevation change of approximately twelve inches, with each successive compacting pass resulting in a successively smaller decrease in elevation as the material becomes progressively more compacted, a wheel elevation measurement at step 554' which is higher than on the previous pass (discounting anticipated resilient expansion of the material) indicates that new, uncompacted lift material has been added since the last pass. On the other hand, a wheel elevation measurement more than twelve inches less than the previous elevation measurement would indicate that previously-compacted material had been removed from the site surface, requiring re-compaction in that area.

If at step 554' the system determines that the current measured wheel elevation is significantly greater or less than the previous measured elevation for that grid cell, the system proceeds to step 556' where the compaction status of the site material at that grid cell is effectively zeroed by recording the current wheel elevation as the elevation of a new lift of uncompacted material. In the illustrated embodiment the system at step 556' treats elevation measurements both significantly greater and significantly less than the previous measurement as a new lift of material. Where the current elevation is significantly greater, the machinery is actually encountering newly-added lift material. Where the currently measured elevation is significantly less than the previous elevation for that grid cell, typically indicating a dozer cut or similar removal of previously compacted surface material, the disturbance to the surface is assumed to place the material in an essentially uncompacted state requiring complete re-compaction as if it were a new lift of material.

In the embodiment illustrated above, the "significantly higher" elevation change which triggers step 556' when new material is encountered may be smaller or larger in scale than the "significantly lower" threshold when material has been removed. It will be apparent to those skilled in the art that different ranges and protocols for treating elevation changes as representing various states of compaction can be used and lie within the scope of the present invention. To some extent the threshold levels for "new lift" determinations will depend on the nature of the material being compacted, and the compaction requirements of the particular site.

At step 557' the system determines whether the currently sensed wheel elevation is relatively the same as the previously sensed elevation of the site at that location, for example within a predetermined window of variance indicating that compaction is complete. If the current wheel elevation is not relatively the same as the previous measured elevation for that grid cell, the system proceeds to step 560' where the current grid cell elevation is recorded for comparison to the elevation sensed on subsequent passes. If the current wheel elevation is determined to be relatively the same as the previous elevation at step 55', the system first proceeds to step 558' where the grid element in the site database is updated to indicate that full compaction has been reached for the current lift of material at that location. The system then proceeds from step 558' to step 560' and the grid element elevation is updated accordingly.

If desired, at optional step 559' the elevation based updating illustrated in FIG. 9 can be performed on an incremental basis between the uncompacted and fully compacted states for a lift of material, for example visually updating the grid element to represent different elevations or percentages of compaction between the uncompacted and fully compacted states. This can be accomplished in a manner similar to the incremental pass count updating illustrated in FIGS. 7E–7G, with visual updates to the grid elements based on percentage of total elevation change rather than the number of passes.

The display of FIG. 6A is suitable for the elevation based site updates generated by the system at FIG. 9, with the number of colors or other visual update cues for the grid elements corresponding to the number of update increments between the uncompacted and fully compacted states.

Figure 8:
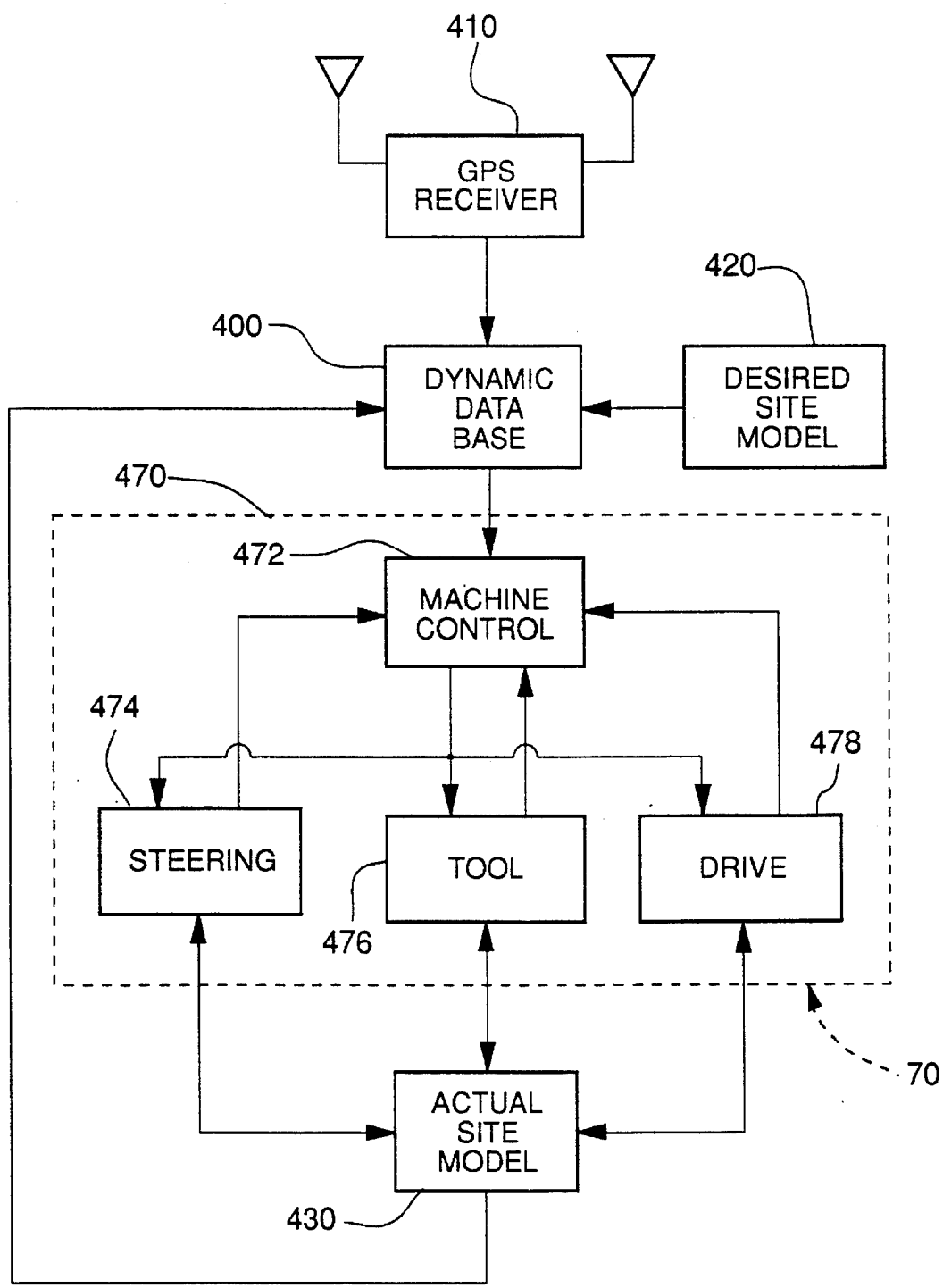
FIG. 8 is a schematic representation of a system used to carry out the present invention, including a closed-loop automatic machine control system.

Referring now to FIG. 8, an alternate system according to the present invention is schematically shown for closed-loop automatic control of one or more operating systems on the compactor. While the embodiment of FIG. 8 is capable of use with or without a supplemental operator display as described above, for purposes of this illustration only automatic machine controls are shown. A suitable digital processing facility, for example a computer as described in the foregoing embodiments, containing the algorithms of the dynamic database of the invention is shown at 400. The dynamic database 400 receives 3-D instantaneous position information from GPS receiver system 410. The desired site model 420 is loaded or stored in the database of computer 400 in any suitable manner, for example on a suitable disk memory. Automatic machine control module 470 contains electrohydraulic machine controls 472 connected to operate, for example, steering and drive systems 474, 476, 478 on the compacting machine. Automatic machine controls 472 are capable of receiving signals from the dynamic database in computer 400 representing the difference between the actual site model 430 and the desired site model 420 to operate the steering and drive systems of the compactor to traverse the site in a manner to bring the actual site model into conformity with the desired site model. As the automatic machine controls 472 operate the steering and drive systems of the machine, the compaction of the site and the current position and direction of the compactor are received, read and manipulated by the dynamic database at 400 to update the actual site model. The actual site update information is received by database 400, which correspondingly updates the signals delivered to machine controls 472 for operation of the steering and drive systems of the compactor as it makes compacting passes over the site to bring the actual site model into conformity with the desired site model.

It will be apparent to those skilled in the art that the inventive method and system can be easily applied to monitor and control almost any compacting operation in which a machine travels over a work site to compact the site topography in real-time. The illustrated embodiments are provided to further an understanding of the broad principles of the invention, and to disclose in detail a preferred application. Many other modifications or applications of the invention can be made and still lie within the scope of the appended claims.

I claim:

1. Apparatus for directing operations of a mobile site compacting machine comprising:

(a) digital data storage and retrieval means for storing a first site model representing a desired degree of compaction of the site and a second site model representing the actual degree of compaction of the site, the degree of compaction comprising a relative degree of compaction based on relative change in the elevation of the site;

(b) means for generating digital signals representing in real time the instantaneous position in three-dimensional space of a portion of the compacting machine as the compacting machine traverses the site;

(c) means for receiving said position signals and for updating the actual degree of compaction of the second model in accordance therewith;

(d) means for determining a difference between the first and second site models in real time, comprising the difference between the actual degree of compaction of the site and the desired degree of compaction of the site as a function of relative change in the elevation of the site; and (e) means for directing the operation of the compacting machine in accordance with the difference to bring the updated second model into conformity with the first model.

2. Apparatus as defined in claim 1, wherein the means for updating the second site model comprises means for determining a change in the elevation of the site relative to a previously measured elevation, and the means for determining a difference comprises means for comparing the relative change to the first site model.

3. Apparatus as defined in claim 2, wherein the first site model comprises a predetermined minimal elevation change.

4. Apparatus as defined in claim 1, wherein the means for determining the difference between the first and second site models includes means for determining whether a currently measured elevation is significantly greater than a previously measured elevation, means for determining whether the currently measured elevation is relatively the same as the previously measured elevation, means for updating the second site model as being in an uncompacted state when the currently measured wheel elevation is significantly greater than the previously measured elevation, and means for updating the second site model as being in a fully compacted state when the currently measured wheel elevation is relatively the same as the previously measured elevation.

5. Apparatus as defined in claim 4, wherein the means for determining the difference between the first and second site models further includes means for determining whether the currently measured elevation is significantly less than the previously measured elevation, and means for updating the second site model as being in an uncompacted state when the currently measured elevation is significantly less than the previously measured elevation.

6. Apparatus as defined in claim 4, further including means for determining whether the difference between the currently measured elevation and the previously measured elevation is within a range between the uncompacted state and the fully compacted state.

7. Apparatus as defined in claim 6, further including means for incrementally updating the second site model between the uncompacted state and the fully compacted state as being in a partially compacted state.

8. Apparatus as defined in claim 1, wherein the means for generating three-dimensional position signals include a GPS receiver.

9. Apparatus as defined in claim 1, wherein the means for directing the operation of the machine include an operator display.

10. A method of directing operation of a mobile site compacting machine comprising the steps of:

(a) producing and storing in a digital data storage and a retrieval means both a first site model representing a predetermined desired degree of compaction of the site and a second site model representing the actual degree of compaction of the site, the degree of compaction comprising a relative degree of compaction based on relative change in the elevation of the site;

(b) generating signals representing in real time the instantaneous position in three-dimensional space of a portion of the compacting machine as the compacting machine traverses the site;

(c) updating the actual degree of compaction of the second model in accordance with said three-dimensional position signals;

(d) determining a difference between the first and second site models in real time, comprising the difference between the actual degree of compaction of the site and the desired degree of compaction of the site as a function of the relative change in the elevation of the site; and (e) directing the operation of the compacting machine in accordance with the difference to bring the updated second site model into conformity with the first site model.

11. A method as defined in claim 10, wherein the means for updating the second site model comprises means for determining a change in the elevation of the site relative to a previously measured elevation, and the step of determining a difference between the first and second site models comprises the step of comparing the relative change to the first model.

12. A method as defined in claim 11, wherein the first site model comprises a predetermined minimal elevation change.

13. A method as defined in claim 10, wherein the step of determining the difference between the first and second site models further includes the steps of determining whether a currently measured elevation is significantly greater than a previously measured elevation, determining whether the currently measured elevation is relatively the same as the previously measured elevation, updating the second site model as being uncompacted if the currently measured elevation is significantly greater than the previously measured elevation, and updating the second site model as being fully compacted if the currently measured elevation is relatively the same as the previously measured elevation.

14. A method as defined in claim 13, wherein the step of determining the difference between the first and second site models further includes the step of determining whether the currently measured elevation is significantly less than the previously measured elevation, and means for updating the second site model as being in an uncompacted state when the currently measured elevation is significantly less than the previously measured elevation.

15. A method as defined in claim 13, further including the step of determining whether the difference between the currently measured elevation and the previously measured elevation is within a range between the uncompacted state and the fully compacted state.

16. Apparatus as defined in claim 15, further including the step of incrementally updating the status of the site model as being in a partially compacted state between the uncompacted and fully compacted states.

17. A method as defined in claim 10, wherein the three-dimensional position signals are generated by a GPS receiver.

18. A method as defined in claim 10, wherein the step of directing the operation of the machine in accordance with the difference between the first and second site models includes providing an operator display of the difference between the first and second site models.

* * * * *

UNITED STATES PATENT AND TRADEMARK OFFICE
CERTIFICATE OF CORRECTION

PATENT NO. : 5,493,494
DATED : February 20, 1996
INVENTOR(S) : Daniel E. Henderson It is certified that error appears in the above-identified patent and that said Letters Patent is hereby corrected as shown below:

In the Abstract, line 18, the word "modes" should be "models".

Column 2, line 1, delete "can," and insert --can--;

Column 3, line 3, delete "site" and insert --site model.--;

Column 6, line 22, delete "radio," and insert --radio--;

Column 17, line 37, delete "55'" and insert --557'--.

Signed and Sealed this

Thirteenth Day of August, 1996

BRUCE LEHMAN

*Attest:*

*Attesting Officer*

Commissioner of Patents and Trademarks